(12) United States Patent
Lee et al.

(10) Patent No.: US 11,459,214 B2
(45) Date of Patent: Oct. 4, 2022

(54) APPARATUS AND METHOD FOR REMOTE CRANE CONTROL

(71) Applicant: PSA INTERNATIONAL PTE LTD, Singapore (SG)

(72) Inventors: Lip Kiong Lee, Singapore (SG); Vee Leung Ho, Singapore (SG)

(73) Assignee: PSA INTERNATIONAL PTE LTD, Singapore (SG)

( * ) Notice: Subject to any disclaimer, the term of this patent is extended or adjusted under 35 U.S.C. 154(b) by 388 days.

(21) Appl. No.: 16/624,267

(22) PCT Filed: Jul. 4, 2017

(86) PCT No.: PCT/SG2017/050338
§ 371 (c)(1),
(2) Date: Dec. 18, 2019

(87) PCT Pub. No.: WO2019/009800
PCT Pub. Date: Jan. 10, 2019

(65) Prior Publication Data
US 2020/0115195 A1    Apr. 16, 2020

(51) Int. Cl.
*B66C 13/40*    (2006.01)
*G06T 7/73*    (2017.01)
(Continued)

(52) U.S. Cl.
CPC ............. *B66C 13/40* (2013.01); *G06T 7/73* (2017.01); *G06V 10/987* (2022.01); *B66C 19/002* (2013.01); *G06T 2207/30204* (2013.01)

(58) Field of Classification Search
None
See application file for complete search history.

(56) References Cited

U.S. PATENT DOCUMENTS 6,648,156 B1 * 11/2003 Bryfors ................. B66C 13/46
                                                                  212/270
2005/0192702 A1    9/2005 Moutsokapas
(Continued)

FOREIGN PATENT DOCUMENTS

CN    105438993    3/2016
CN    106629399    5/2017
(Continued)

OTHER PUBLICATIONS

International Search Report received in PCT/SG2017/050338, dated Jul. 27, 2017, 3 pages.
(Continued)

*Primary Examiner* — Tamara L Weber
(74) *Attorney, Agent, or Firm* — Klarquist Sparkman, LLP

(57) ABSTRACT

An apparatus and a method for remote crane control, the apparatus comprising: a memory for storing instructions; and a processing unit configured to execute the instructions stored in the memory to control the apparatus to: receive one or more images comprising a view of a location on which a crane spreader is to land; display the one or more images on a display; receive user input to mark one or more markers on the one or more received images to facilitate landing of the crane spreader; and transmit position data of the one or more markers in the one or more received images to a processor for determining values defining positioning of the crane spreader relative to the position data of the one or more markers to offset so that the crane spreader proceeds to land based on the determined values.

15 Claims, 10 Drawing Sheets

(51) Int. Cl.
*G06V 10/98* (2022.01)
*B66C 19/00* (2006.01)

(56) References Cited

U.S. PATENT DOCUMENTS

| | | | |
|---|---|---|---|
| 2005/0281644 A1* | 12/2005 | Lussen | B66C 13/085 |
| | | | 414/403 |
| 2015/0217976 A1 | 8/2015 | Tanizumi et al. | |
| 2015/0291400 A1 | 10/2015 | Rintanen | |
| 2016/0167932 A1* | 6/2016 | Holmberg | G06K 9/6215 |
| | | | 382/104 |
| 2020/0109036 A1* | 4/2020 | Yamakawa | B66C 13/48 |
| 2021/0114847 A1* | 4/2021 | Schilling | B66C 13/44 |

FOREIGN PATENT DOCUMENTS

| | | |
|---|---|---|
| DE | 1036398 | 3/2003 |
| JP | 2002-241078 | 8/2002 |
| JP | 2016-175766 | 10/2016 |
| WO | WO 2002/014202 | 2/2002 |

OTHER PUBLICATIONS

Written Opinion received in PCT/SG2017/050338, dated Aug. 1, 2017, 6 pages.
International Preliminary Report on Patentability, received in PCT/SG2017/050338, dated Jul. 25, 2018, 14 pages.
Extended European Search Report received in counterpart EP 17917187.1, dated Feb. 8, 2021, 8 pages.

* cited by examiner

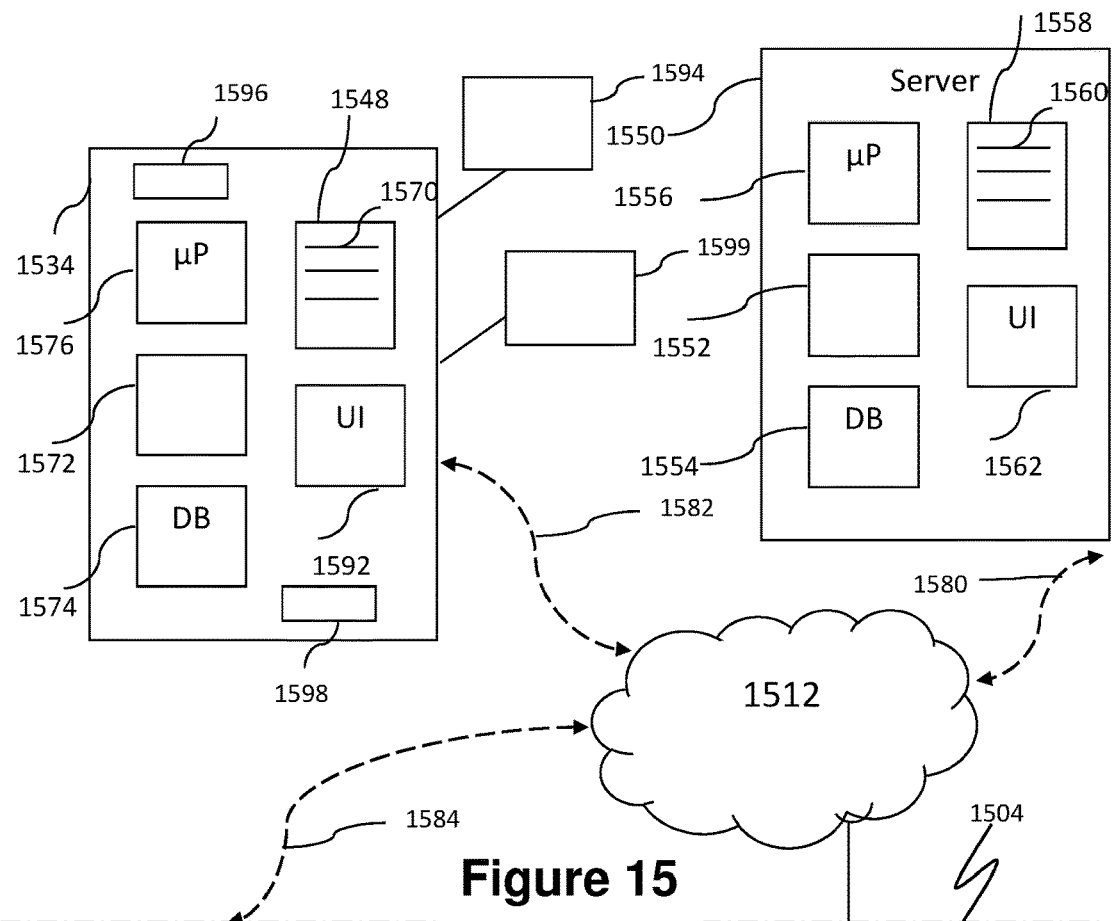
Figure 15
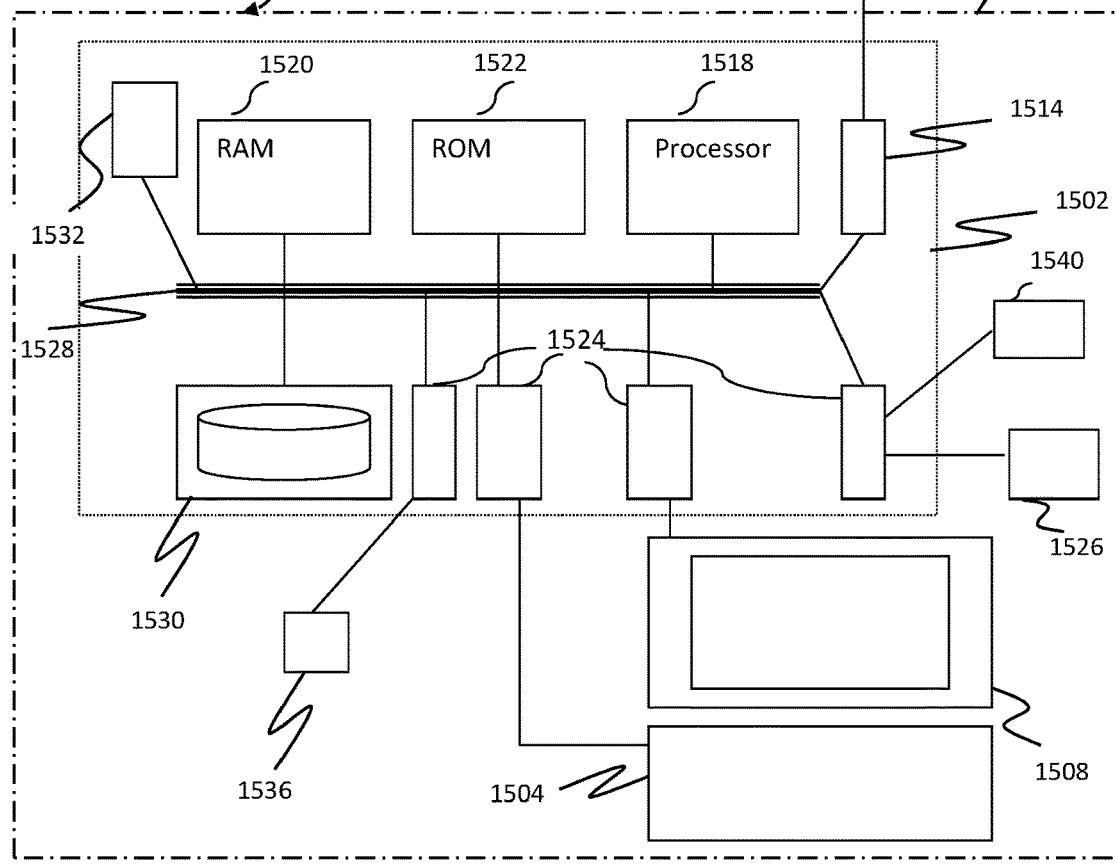

APPARATUS AND METHOD FOR REMOTE CRANE CONTROL

CROSS REFERENCE TO RELATED APPLICATIONS

This is the U.S. National Stage of International Application No. PCT/SG2017/050338 filed Jul. 4, 2017, which was published in English under PCT Article 21(2) and which application is hereby incorporated herein by reference in its entirety.

FIELD OF THE INVENTION

The present invention relates to an apparatus and a method for remote crane control, in particular, for controlling a crane to move a container.

BACKGROUND

Cranes are largely used in ports, harbors, construction yards, storage depots, and the like to move containers.

Each crane is typically controlled by an operator situated on-site in a driver cabin on top of the crane. Each crane is controlled using a known setup comprising a joystick and buttons on a console located in the cabin.

In more advanced ports, each crane may be controlled remotely by an operator sitting in a control center instead of the cabin of the crane (For example, International Patent Publication No. WO2002/014202; Title: Remote Container Handling System). The control center has a console for controlling a crane like in the cabin of the crane. In addition, there are one or more displays for streaming real-time video of images captured from cameras mounted at a site of the crane. When the operator receives a job to move a container, he will use the joystick and the buttons on the console and the real-time video stream to remotely adjust the position of a crane spreader of the crane before landing the crane spreader onto the container to engage and lift the container for moving to another location.

Although the control center can provide a more comfortable working environment for the operator, the speed of operation of the crane, which affects productivity, varies from operator to operator and depends on the skill set and the level of fatigue of the operator.

Furthermore, remote crane control from the control center requires a high speed network infrastructure to provide low latency visual display. Low latency video streaming is important for accurate remote control of cranes and to ensure high productivity. Consistent high reliability and interference resistance can only be guaranteed by a wired network, preferably using fiber optics, which can be very costly. To reduce cost to build the wired network, the building location of a control center is typically restricted to a location not far from the actual sites of the cranes.

Moreover, learning time for an operator to use the console to control a crane may take days. To acquire sufficient skill to operate the crane efficiently and productively may take even longer.

While there are in existence fully automated crane control systems relying entirely on machines, there are some setbacks to such systems. For instance, inability of the machine to consider safety of crew working in the vicinity of the site of the crane, high setup and equipment cost, and high maintenance cost. Some ports actually disallow fully automated crane control systems for human safety reasons.

SUMMARY

According to one aspect of the present disclosure, there is provided an apparatus for remote crane control, the apparatus comprising: a memory for storing instructions; and a processing unit configured to execute the instructions stored in the memory to control the apparatus to: receive one or more images comprising a view of a location on which a crane spreader is to land; display the one or more images on a display; receive user input to mark one or more markers on the one or more received images to facilitate landing of the crane spreader; and transmit position data of the one or more markers in the one or more received images to a processor for determining values defining positioning of the crane spreader relative to the position data of the one or more markers to offset so that the crane spreader proceeds to land based on the determined values.

According to another aspect of the present disclosure, there is provided a method for remote crane control, the method comprising: receiving one or more images comprising a view of a location on which a crane spreader is to land; displaying the one or more images on a display; receiving user input to mark one or more markers on the one or more received images to facilitate landing of the crane spreader; and transmitting position data of the one or more markers in the one or more received images to a processor for determining values defining positioning of the crane spreader relative to the position data of the one or more markers to offset so that the crane spreader proceeds to land based on the determined values.

BRIEF DESCRIPTION OF THE DRAWINGS

Embodiments of the invention will be better understood and readily apparent to one skilled in the art from the following written description, by way of example only and in conjunction with the drawings, in which:

FIG. 15 shows an example of architecture of apparatuses and devices of the present invention.

DESCRIPTION

The present disclosure discusses an apparatus and a method for remote crane control or specifically, remote guided crane operation in a container terminal. Such container crane and container terminal may be present in a seaport (harbor), a storage building facility, a construction yard, on board a ship and the like. One advantage of the apparatus and method of the present disclosure is a process change from one of controlling, be it remote control or on-site control, a crane spreader to align to a container manually using the known joystick and console setup, to a better process of remotely controlling or guiding a crane spreader by just indicating positional information decided by a crane operator to allow a crane to automatically align the crane spreader to the container. One motivation of the process change is to simplify the work of the crane operator in the remote control of the crane.

Figure 1:
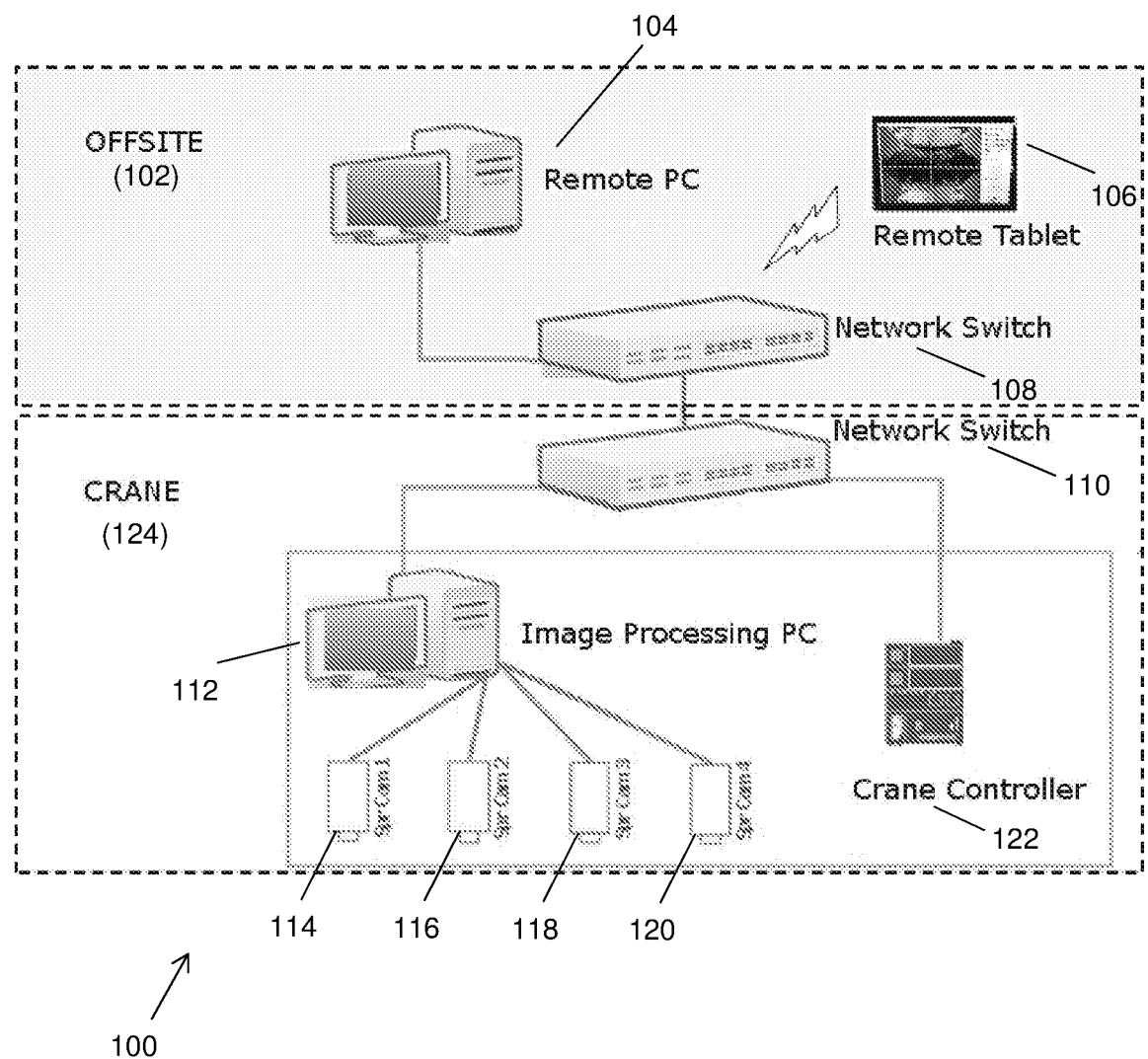
FIG. 1 shows system architecture of an example of the present invention.

FIG. 1 illustrates an example of a setup or system 100 for remote crane control of the present disclosure. The setup or system 100 has an offsite portion 102, which is operable remotely by one or more crane operators, and a crane portion 124, which is located at the site of a crane spreader.

The offsite portion 102 includes a network switch 108 for connecting to the crane portion 124 to enable data communication. The offsite portion 102 also has a remote personal computer 104 and/or a remote mobile device 106, for instance, a tablet, smartphone, laptop, and the like, each of which being operable by a crane operator. Each of the remote personal computer 104 and the remote mobile device 106 can be said to be an example of an apparatus for remote crane control of the present disclosure. The remote mobile device 106 may connect to the network switch 108 via wired technologies or wireless technologies, for instance, WiFi, Bluetooth and the like. Similarly, the remote personal computer 104 may connect to the network switch 108 via the same wired or wireless technologies.

The crane portion 124 includes a network switch 110 for connecting to the network switch 108 of the offsite portion 102 to enable data communication between the network switch 108 and the network switch 110. The crane portion 124 also has an image processing personal computer 112 (or also known herein as an image processing unit) connected to one or more cameras and connected to the network switch 110 for receiving instructions to control the one or more cameras. The image processing personal computer 112 is for transmission of images captured by one or more cameras to the remote personal computer 104 and/or the remote mobile device 106 via the network switches 108 and 110. The image processing personal computer 112 also controls the capturing of images if a crane operator instructs via the remote personal computer 104 and/or the remote mobile device 106 for one or more specific image to be captured.

In this example, the one or more cameras includes 4 cameras 114, 116, 118 and 120 mounted separately at 4 corners of a crane spreader for capturing images to obtain a top view of 4 different corners of a container located beneath the crane spreader or of a location or site on which a container carried by the crane spreader is to be placed. The location or site may have an existing container for the crane spreader to place a container carried by the crane spreader thereon. The location or site may have a trailer (also known as chassis) on which a container carried by the crane spreader is to be placed. The location or site may be just ground, preferably containing ground markings marking out a container placement lot for a container carried by the crane spreader to place on the ground.

For example, each of the 4 cameras 114, 116, 118 and 120 is mounted at each of the 4 sharp corners of the crane spreader, which in most instances is generally or substantially rectangular in shape. It is appreciated that use of one camera is also possible as long as it can capture with sufficient clarity an image containing at least one top view of a corner casting of a container on the ground, ground markings on the ground, or an edge portion (landing guide) of a trailer (depending on the crane operation). The location to mount the one or more cameras on the crane spreader should be such that at least an image containing at least one top view of the corners of the container, corners of ground markings or edge portions (landing guides) of a trailer (depending on crane operation), can be captured by the one or more cameras with sufficient clarity.

The crane portion 124 includes a crane controller 122 typically residing in a crane having the crane spreader. The crane controller 122 is connected to the network switch 110 and the crane controller 122 is for controlling movements of the crane and the crane spreader based on data received from the remote personal computer 104 and/or the remote mobile device 106 via the network switches 108 and 110. The crane controller 122 may be a programmable logic controller (PLC).

Data communication including transmission of data and instructions between the remote personal computer 104 and/or the remote mobile device 106 and the image processing personal computer 112 or the crane controller 122 takes place during remote crane control operation. The data transmission may include transmitting instructions from the remote personal computer 104 and/or the remote mobile device 106 to the image processing personal computer 112 to capture one or more specific image through use of the one or more cameras 114, 116, 118, and 120. The data transmission may include transmitting of data of one or more images captured by the one or more cameras 114, 116, 118, and 120 for displaying on a display of the remote personal computer 104 and/or the remote mobile device 106. The data transmission may further include transmission of position data of one or more markers marked on an image displayed on the display.

Depending on crane operation, the image may include a view of a container beneath the crane spreader and at least one corner casting of the container, a view including a corner ground marking of ground markings marking out a container placement lot, or a view of an edge portion (landing guide) of a trailer that can provide reference for landing a crane spreader carrying a container onto the trailer. For the crane operation to lift or hoist a container, or to land a container on another container, the one or more markers can be marked by a crane operator at the corner of a corner casting of the container in the image. For the crane operation to place a container carried by a crane spreader on a ground having ground markings of a container placement lot, the one or more markers can be marked by the crane operator at, for instance, a corner of a ground marking in the image or any ideal location of the ground marking depending on its shape and configuration. It is appreciated that the ground marking can be shaped in any suitable manner and the crane operator would be trained to place a marker at the right location. For the crane operation to place a container carried by a crane spreader on a trailer, the one or more markers are marked by the crane operator at, for instance, a specially built edge structure or portion (landing guide) extending from or mounted on the trailer that is used as a reference for the crane operator to control the crane spreader to place the container that is carried by the crane spreader on the trailer.

The position data of the one or more markers obtained from marking by the crane operator on one or more captured images can be processed, for instance, at the remote personal computer 104, the remote mobile device 106, the image processing personal computer 112 or the crane controller 122 to determine values defining positioning ("positioning" includes orientation and position) of the crane spreader relative to the container to offset for the crane spreader to carry out the crane operation. In the present example, the image processing personal computer 112 carries out the processing of the position data of the one or more markers to determine the values. The determined values are then converted into instructions or commands for the crane controller 122 to control the crane. The data transmission may further include transmission of instructions from the remote personal computer 104 and/or the remote mobile device 106 to the crane controller 122 to control the crane movements.

Details on the marking of the one or more markers marked in the one or more images and the processing of the position data of the one or more markers to determine values defining positioning of the crane spreader relative to the container to offset for the crane spreader to carry out specific crane operation are as follows.

Figure 3:
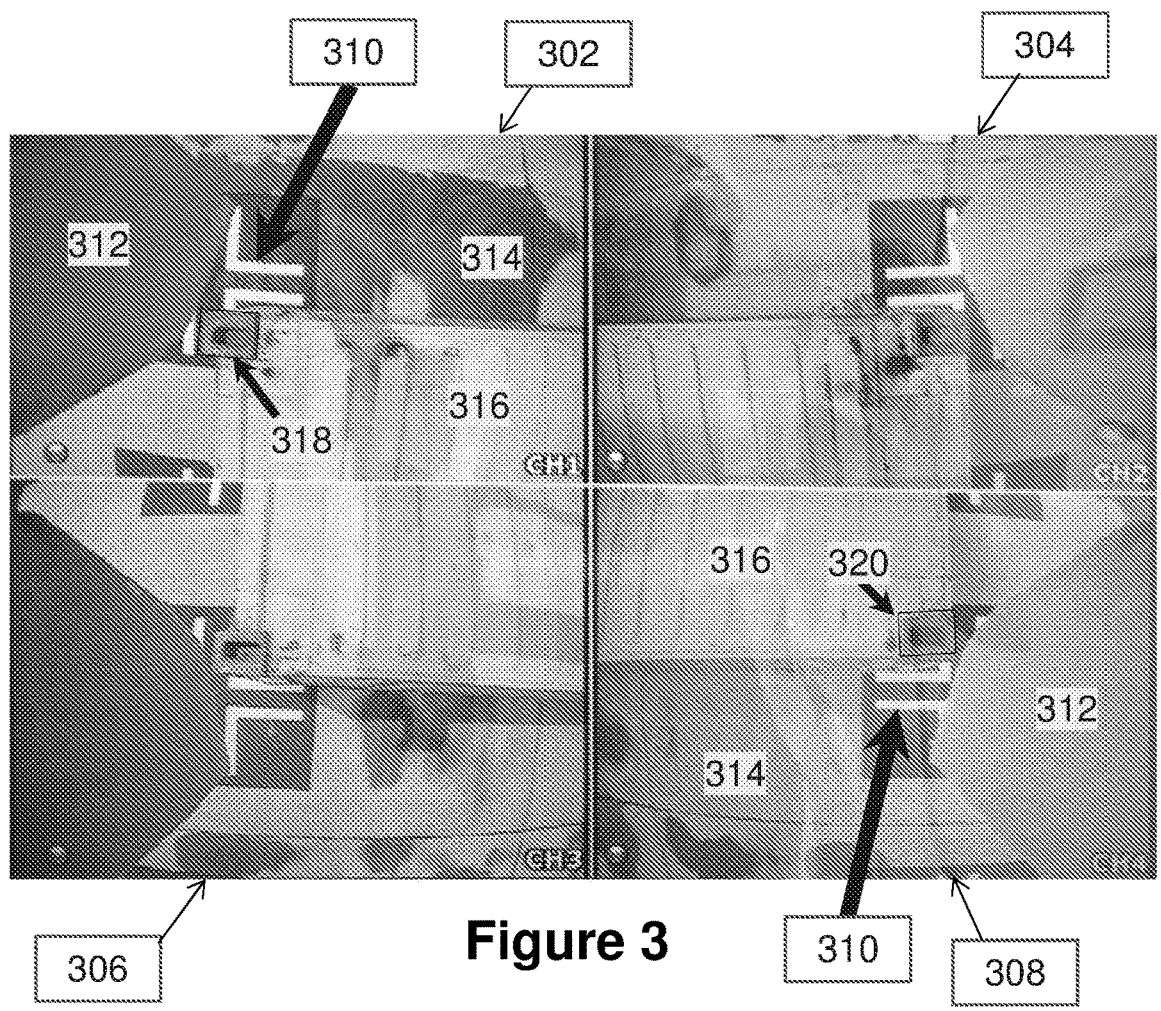
FIG. 3 shows four static images captured by cameras mounted on a crane spreader according to an example of the present invention.

FIG. 3 shows an example of how 4 images 302, 304, 306 and 308 captured respectively by the 4 cameras 114, 116, 118 and 120 as described with reference to FIG. 1 would look like. Each image 302, 304, 306 and 308 captures a portion of the crane spreader 312, and a view of a top of a container 316 previously placed on a ground 314. The images 302 and 304 are images containing opposite corners of a longer side (i.e. length) of the container 316 in a top view of the container 316. Similarly, the images 306 and 308 are images containing opposite corners of a longer side of the container 316 in a top view of the container 316. Accordingly, the images 302 and 306 are images containing opposite corners of a shorter side (i.e. width) of the container 316 in a top view of the container 316. Similarly, the images 304 and 308 are images containing opposite corners of a shorter side (i.e. width) of the container 316 in a top view of the container 316. There are markings 310 on the ground 314 used for guiding the previous placement of the container 316 on the ground 4.

The 4 cameras 114, 116, 118 and 120 are respectively mounted at a location on or about each of the 4 sharp corners of the crane spreader 312. All the 4 corners of the container 316 with 4 respective corner castings, including 318 and 320 marked out in FIG. 3, are shown separately in the images 302, 304, 306, 308 respectively. Images 304 and 306 are deliberately presented in FIG. 3 without reference numerals and arrows to illustrate how the actual images 302, 304, 306 and 308 would look like on the display of the remote personal computer 104 of FIG. 1 and/or the remote mobile device 106 of FIG. 1.

After the images 302, 304, 306 and 308 are displayed on the display of the remote personal computer 104 of FIG. 1 and/or the remote mobile device 106 of FIG. 1, these images can be manipulated by a crane operator so that at least one marker can be marked on at least one of the images 302, 304, 306, 308. The position data of the marker is to be further processed later at the remote personal computer 104, the remote mobile device 106, the image processing personal computer 112 or the crane controller 122 of FIG. 1 to determine values defining positioning of the crane spreader relative to the container to offset for the crane spreader to engage the container located beneath the crane spreader and enable the crane comprising the crane spreader to lift the container.

Figure 4:
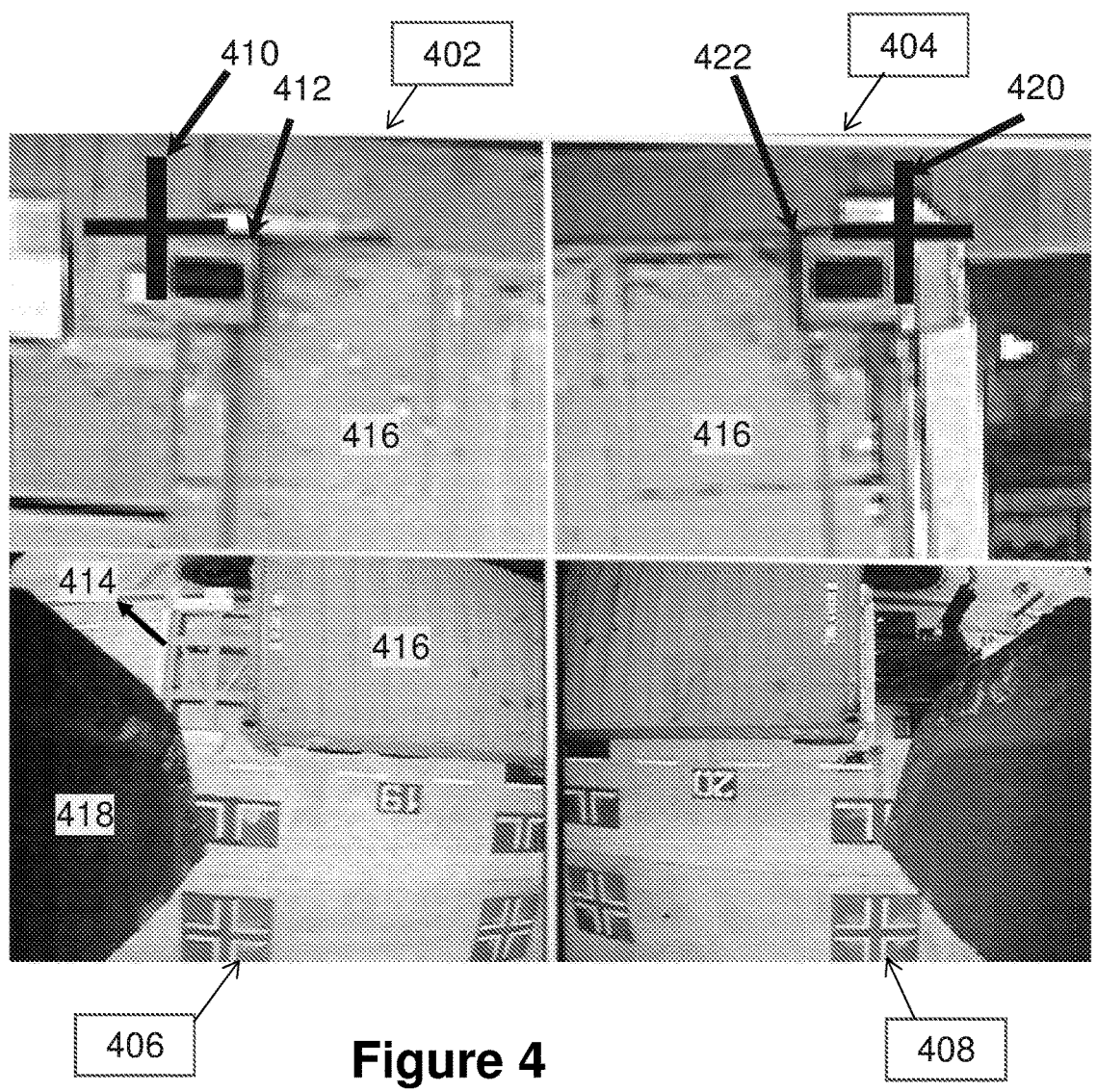
FIG. 4 shows the captured four static images but with two of which digitally zoomed/focused and comprising markers input by a user.

For example, FIG. 4 shows 4 images 402, 404, 406, and 408 similarly captured and displayed on the display like the images 302, 304, 306 and 308 of FIG. 3 respectively. Each image 402, 404, 406 and 408 captures a top view of a container 416 previously placed on a trailer 414. The trailer 414 carrying the container 416 was parked in a designated parking lot. The trailer 414 is only visible in image 406. Each image 402, 404, 406 and 408 separately captures each of 4 corner castings of the container 416 respectively, including the corner castings 412 and 422 marked out in FIG. 4. The images 402 and 404 are images containing opposite corners of a longer side (i.e. length) of the container 416 in a top view of the container 416. Similarly, the images 406 and 408 are images containing opposite corners of a longer side of the container 316 in a top view of the container 416. Accordingly, the images 402 and 406 are images containing opposite corners of a shorter side (i.e. width) of the container 416 in a top view of the container 416. Similarly, the images 404 and 408 are images containing opposite corners of a shorter side (i.e. width) of the container 416 in a top view of the container 416. The image 408 is deliberately presented without reference numerals and arrows to illustrate how the actual images 402, 404, 406 and 408 would look like on the display of the remote personal computer 104 of FIG. 1 and/or the remote mobile device 106 of FIG. 1. In the images 406 and 408, part of a crane spreader 418 is captured. Specifically, this part of the crane spreader 418 can comprise a device for engaging the respective corner casting of the container 416.

Unlike images 302 and 304 of FIG. 3, the images 402 and 404 are digitally zoomed in or focused views of a region surrounding the respective corner castings 412 and 422 of the container 416. The crane operator can control such zooming or focusing through, for instance, a user input interface of the remote personal computer 104 of FIG. 1 and/or the remote mobile device 106 of FIG. 1. Such zoomed in or focused view of the corner castings 412 and 422 facilitates the crane operator to pin point and mark with higher accuracy a position of a sharp pointed edge of a corner of the container 416. This sharp pointed edge also happens to be a corner of the respective corner casting 412 and 422 that is furthest from a central point of the container 416. The marking of the sharp pointed edge of the corner of the container 416 that is to be performed by the crane operator appears as a marker 410 in image 402 and as a marker 420 in image 404.

In the present example, the shape of each marker 410 and 420 is in the form of a cross. The crucial position data of the markers 410 and 420 that is used in further processing is the position data of the center of the cross in the respective image 402 and 404. Each of these two markers 410 and 420 are marked by a crane operator through the user input interface of the remote personal computer 104 of FIG. 1 and/or the remote mobile device 106 of FIG. 1.

Similarly, in other examples described later with reference to other figures, the shape of the marker or markers described are cross shaped. However, it is appreciated that any other shape suitable for marking and pinpointing can also be used in the present example and in the other examples.

The user input interface may include, for instance, touch screen capabilities of the display of the remote personal computer 104 of FIG. 1 and/or the remote mobile device 106 of FIG. 1 that enables user markings on the image and enables user activation for the image zooming or focusing by way of touch, a user input device such as a mouse controlling a cursor to make markings on the image and activate the image zooming or focusing, a cursor direction control keypad controlling a cursor to make markings on the image and activate the image zooming or focusing, a joystick controlling a cursor to make markings on the image and activate the image zooming or focusing, and the like.

Applicable to all examples described in the present disclosure, the crane operator may request for one or more images to be captured by each camera mounted on the crane spreader as he/she desires. For instance, if an image is unclear, the crane operator may instruct another image to be captured using the user input interface of the remote personal computer 104 of FIG. 1 and/or the remote mobile device 106 of FIG. 1.

Although only digital zooming or focusing is described above and also in other examples of the present disclosure, it is appreciated that optical zooming or focusing is also possible in examples of the present invention. For instance, the crane operator instructs via the setup or system 100 a camera to capture a static image after, for example, 2 times optical zoom.

The position data of the two markers 410 and 420 can be further processed as follows to determine the 3 abovementioned values defining positioning of the crane spreader relative to the container to offset for the crane spreader to engage the container located beneath the crane spreader and enable the crane comprising the crane spreader to lift the container.

Figure 5:
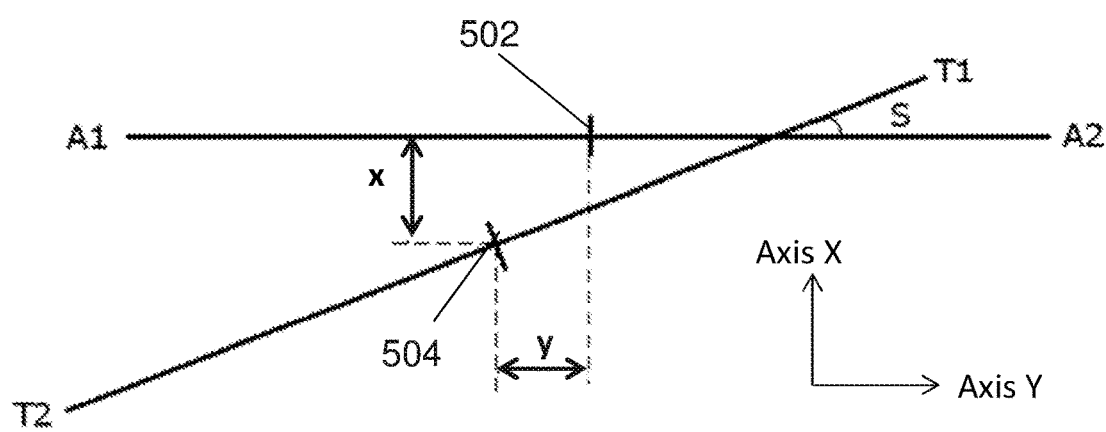
FIG. 5 is a geometric representation of calculations/computations to be performed to derive offset values or parameters for adjusting a crane spreader according to an example of the present invention.

The markers 410 and 420 may be identified by pixel location in the respective image. From the pixel location, position data of the markers 410 and 420 can be derived for geometrical calculation. Current positioning of the crane spreader that is known is used in the geometrical calculation as well. FIG. 5 illustrates the geometrical calculation process, which will be elaborated later.

Figure 2:
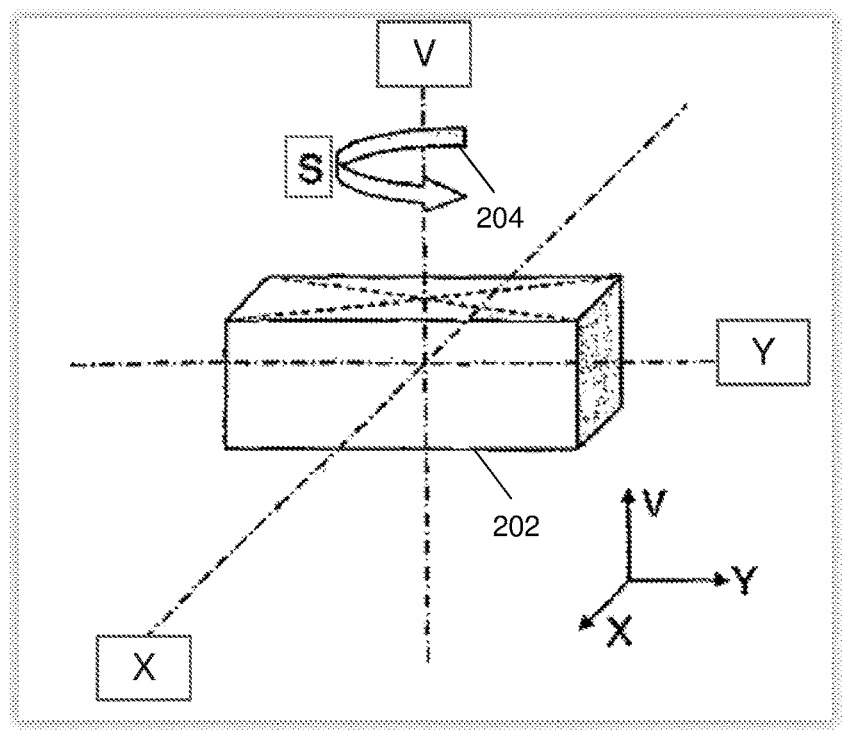
FIG. 2 shows horizontal and vertical axes and a skew angle of a container that are considered by an example of the present invention.

FIG. 2 illustrates a typical cuboid shaped container 202 with a length longer than a height and a width of the container. FIG. 2 shows three perpendicular axes V, X and Y of the container 202. Axis V is a vertical axis indicative of the height of the container 202. X and Y are horizontal axes. Axis Y is indicative of the length of the container 202 and can be said to extend in a gantry direction of the container 202. Axis X is indicative of the width of the container 202 and can be said to extend in a trolley direction of the container 202.

In order for a crane spreader to land onto a container 202 accurately and to engage and hoist the container 202 up, typically 3 sets of values or parameters to offset the position of the crane spreader to align with the container for engaging the container are required:

1) Offset of the crane spreader relative to the container 202 in the trolley direction (x) i.e. offset in Axis X.

2) Offset of the crane spreader relative to the container 202 in the gantry direction (y) i.e. offset in Axis Y.

3) Offset in terms of a skew angle (S) between the crane spreader and the container 202 about the Axis V. FIG. 2 shows an arrow 204 indicating how the skew angle (S) is considered.

Once the 3 above-mentioned offset values or parameters (x, y and S) are determined or obtained, data of these offset values or parameters can be fed or input to the crane controller 122 of FIG. 1. Thereafter, the crane controller 122 of FIG. 1 will instruct or command the crane to move the crane spreader according to the offset values or parameters to align with the container 202. Once aligned, the crane spreader can then land and engage the container 202 and the container 202 can be moved by the crane.

With reference to FIG. 2, FIG. 4 and FIG. 5, the 3 above-mentioned offset values or parameters (x, y and S) described with reference to FIG. 2 are derived from the position data of the 2 markers, for example, 410 and 420 in FIG. 4, as follows. FIG. 5 is applicable to all crane operations, including landing/hoisting a target container on the ground, landing/hoisting a target container on top of another container, and landing/hoisting a target container on a trailer.

In the crane operation of FIG. 4, the crane spreader 418 will be engaging corner castings on opposite ends of a corresponding longer side of the container 416. For other crane operations that would be discussed later, the crane spreader may be landing a container on another container, landing in a container placement lot marked out by ground markings on a ground, or landing a container on a trailer. For all types of crane operations, A1 and A2 are the known positions of 2 opposite corners of the crane spreader with one or more cameras mounted thereon. For instance, A1 and A2 can be the opposite ends of a longer side (length), shorter sider (width) of the crane spreader or opposite corners diagonally of the crane spreader. A central point 502 of the crane spreader halfway between a line drawn between A1 and A2 is derived.

In the crane operation of FIG. 4, FIG. 5 is scaled based on a top view of the target container 416 in FIG. 4 from the crane spreader 418 that has to be aligned with the container 416. A1 and A2 are the positions of 2 opposite ends of a longer side (length) of the crane spreader 418.

For any crane operation, T1 and T2 are the positions of the one or more markers marked by the crane operator. A central point 504 halfway between T1 and T2 is derived.

Specifically for the crane operation of FIG. 4, T1 and T2 are the positions of the marked corners of the container 416 derived from the marked images 402 and 404, wherein T1 corresponds to marker 410 and T2 corresponds to marker 420. In the example of FIG. 4, T1 and T2 are the opposite ends of a longer side (length) of the container 416. The 2 markers used to derive the offset values or parameters for the example of FIG. 4 are the markers 410 and 420, which are at opposite ends of the longer side of the container 416. It is also possible to use 2 markers added by a crane operator in the images such as markers in images 402 and 406, or markers in images 404 and 408 to derive the offset values or parameters. However, each pair of the images 402 and 406 or the images 404 and 408 shows opposite ends of a shorter side (width or breath) of the container 416. The use of markers on the shorter side (width or breath) of the container 416 may result in higher alignment error in the offset values or parameters. Hence, use of markers on the longer side (length) of the container 416 may be preferred in some instances. In addition, it is also possible to use 2 markers from diagonally opposite ends to derive the offset values or parameters. For instance, the case in which there are markers in images 402 and 408, or markers in images 404 and 406.

In FIG. 5, the Axis X mentioned in FIG. 2 is perpendicular to the line A1-A2. The Axis Y mentioned in FIG. 2 is parallel to the line A1-A2 in FIG. 5. Axis Y of FIG. 2 is perpendicular to Axis X of FIG. 2. Axis V mentioned in FIG. 2 is orthogonal to Axis Y and Axis X. With reference to FIG. 5, Axis V extends in and out of the page on which FIG. 5 is drawn. The Axis X and Axis Y of FIG. 2 are shown in FIG. 5.

To align the crane spreader and the container 416, the 2 lines A1-A2 and T1-T2 in FIG. 5 have to be aligned. The offset value (x) in Axis X can be computed from a distance of the positions of the 2 derived central points 502 and 504 along Axis X as shown in FIG. 5. The offset value (y) in Axis Y can be computed from a distance of the positions of the 2 derived central points 502 and 504 along Axis Y as shown in FIG. 5. The angular offset value (S) about the Axis V can be computed from an angle formed by the intersection of the 2 lines A1-A2 and T1-T2 as shown in FIG. 5.

The algorithm used to determine the 3 above-mentioned offset values or parameters based on the geometrical explanation provided above can be programmed accordingly as software stored in a memory and invoked accordingly by the processor or processing unit of, for instance, the remote personal computer 104, the remote mobile device 106, the image processing personal computer 112 and/or the crane controller 122 of FIG. 1 to determine the 3 above-mentioned offset values or parameters.

In the case of deriving the offset values using 2 markers from, for instance, the images 402 and 406 or the images 404 and 408, which are in the opposite ends of a shorter side (width or breath) of the container 416, similar steps of derivation as the one explained above for using the longer side (length) of the container 416 and the crane spreader can be applied. However, A1 and A2 will be opposite ends of a shorter side (width or breath) of the crane spreader for engaging corner castings on opposite ends of a corresponding shorter side of the container 416. T1 and T2 will be the opposite ends of a shorter side (width or breath) of the container 416.

Similarly, in the case of deriving the offset values using 2 markers from, for instance, the images 402 and 408 or the images 404 and 406, which are in the diagonally opposite ends of the container 416, similar steps of derivation as the one explained above for using the longer side (length) of the container 416 and the longer side (length) of the crane spreader 418 can be applied. However, A1 and A2 will be diagonally opposite ends of the crane spreader for engaging corner castings on diagonally opposite ends of the container 416. T1 and T2 will be the diagonally opposite ends of the container 416.

Although derivation of the 3 above-mentioned offset values or parameters (also known as positioning offset values) is performed using 2 markers above, it may be possible to make use of only one user input image marker at a corner of a container in an image to derive the 3 above-mentioned offset values or parameters. In this case, the single user input marker may be in a form of a cross like each of the markers 410 and 420 in FIG. 4. However, there may be an additional action which the user has to perform and that is to rotate the cross on the display of the remote personal computer 104 and/or the remote mobile device 106 so that the lines of the cross are aligned with the sides of the container 416. The position data of the marker to obtain in this case would be the coordinates or the pixel location of the lines of the cross that are aligned with the sides of the container 416. The positioning offset values in this case can be derived based on the rotation angle of the marked cross, the position of the lines of the cross, the position of the single user input marker and/or the predetermined/known length of the container. For instance, one of the lines of the cross rotated to align with the sides of the container can correspond with line T1-T2 of FIG. 5. With line T1-T2 derived, the offset values can be derived using the concept taught by FIG. 5. In another example, it is possible for a user to mark out just one marker and in addition, draw a line such as T1-T2 of FIG. 5 in the one or more images provided. With one marker and the line corresponding to T1-T2 present, certainly the positioning offset values can be derived using the concept taught by FIG. 5.

Similarly, it is possible to make use of 3, 4 or even more markers for higher accuracy determination of the 3 above-mentioned offset values or parameters. In the case of 3 markers, for instance, marked in 3 out of the 4 images in FIG. 3 or 4, the same two lines A1-A2 and T1-T2 can be drawn for deriving positioning offset values of the crane spreader relative to a longer side (length) of the container and for deriving another set of positioning offset values of the crane spreader relative to a shorter side (width or breath) of the container. With two sets of positioning offset values, an average set of positioning offset values can be derived as the actual positioning offset values.

Figure 6:
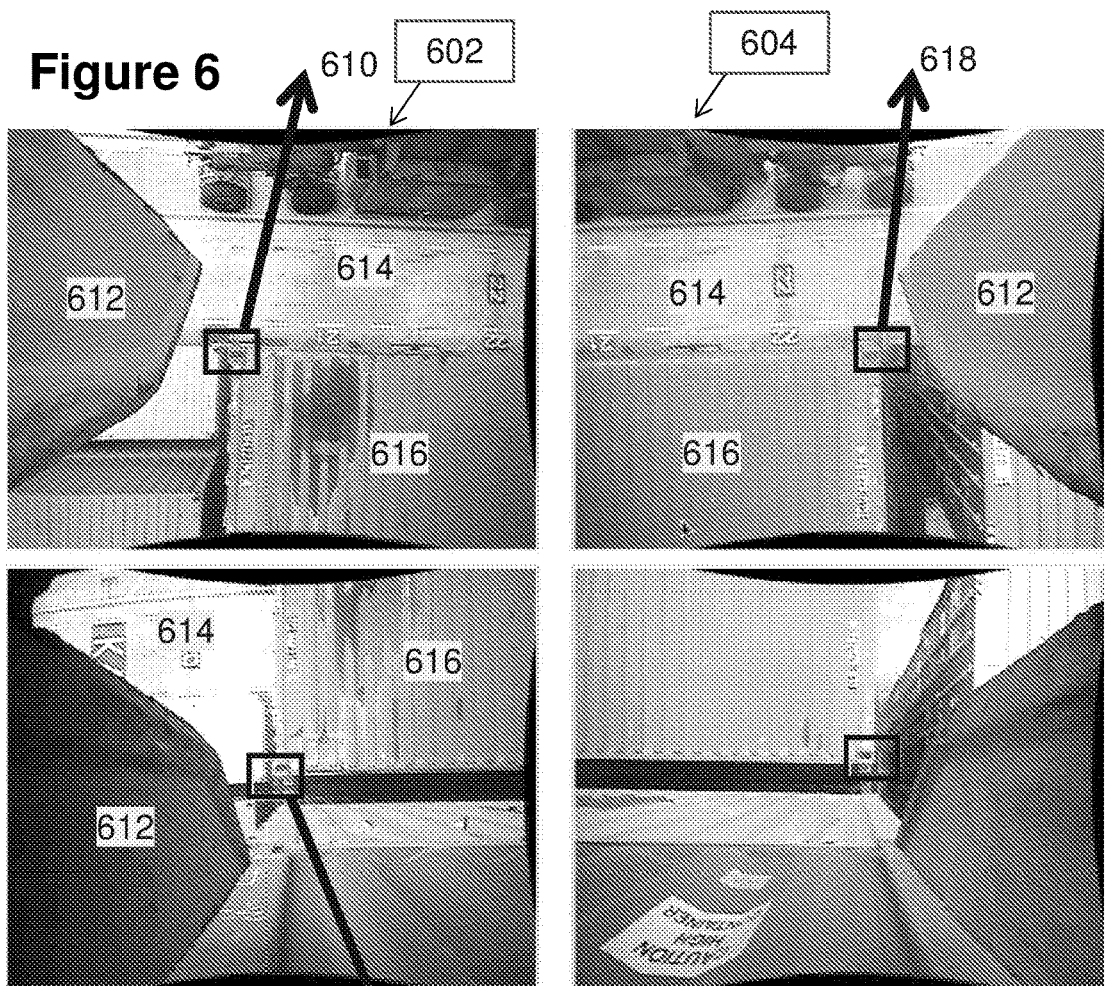
FIG. 6 shows another four captured static images with a boundary marking out a region comprising a corner casting in each image according to an example of the present invention.

FIG. 6 shows 4 images 602, 604, 606, and 608 similarly captured and displayed on the display like the images 302, 304, 306 and 308 of FIG. 3 respectively and like the images 402, 404, 406 and 408 in FIG. 4 respectively. Each image 602, 604, 606 and 608 captures a top of a view of a container 616 previously placed on another container (not visible in any of the images 602 to 608). The ground beside the container stack including the container 616 is given a reference numeral of 614. The crane operation in this example is to engage the container 616 using a crane spreader 612 and to lift or hoist the container 616 up for moving it to another location.

Each image 602, 604, 606 and 608 separately captures each of 4 corner castings of the container 616 respectively. The images 602 and 604 contain opposite corners of a longer side (i.e. length) of the container 616 in a top view of the container 616. Similarly, the images 606 and 608 contain opposite corners of a longer side of the container 616 in a top view of the container 616. Accordingly, the images 602 and 606 contain opposite corners of a shorter side (i.e. width) of the container 616 in a top view of the container 616. Similarly, the images 604 and 608 contain opposite corners of a shorter side (i.e. width) of the container 616 in a top view of the container 616. The image 608 is deliberately presented without reference numerals and arrows to illustrate how the actual images 602, 604, 606 and 608 would look like on the display of the remote personal computer 104 of FIG. 1 and/or the remote mobile device 106 of FIG. 1. In all the images 602, 604, 606 and 608, part of the crane spreader 612 is captured. Specifically, this part of the crane spreader 612 can comprise a device for engaging the respective corner casting of the container 616.

The main items illustrated in FIG. 6 are 4 boundaries 610, 618, 620, including a fourth boundary in image 608. It is noted that such boundaries are optional features. These 4 boundaries, 610, 618, 620 and the fourth boundary in the image 608, are generated by a computer/machine to guide a crane operator where he/she should be marking markers on each one of the respective images 602, 604, 606, and 608. A processor/processing unit of the computer/machine applying vision/imaging techniques is used to process each of the images 602, 604, 606, and 608 to determine location of each corner casting of the container 616 in the respective images 602, 604, 606 and 608. Corner castings all have rather similar design and that facilitates detection via vision/imaging techniques. Furthermore, if each camera is physically mounted to capture images such that the corner casting in the container would be located centrally, it would not be difficult to a skilled person to work out the vision/imaging technique to locate the corner casting in each image. Once the location of each corner casting is determined, the processor/processing unit of the computer/machine generates a boundary highlighting a region/area where the corner casting should be in the image. This boundary is also indicative of where the crane operator should be making markings in the image. It is appreciated that the computer/machine may, for example, be one or more of the remote personal computer 104 of FIG. 1, the remote mobile device 106 of FIG. 1, the image processing personal computer 112 of FIG. 1 or the crane controller 122 of FIG. 1. In the present example, each boundary, including 610, 618, 620 and the fourth boundary in image 608, are shaped as a square or rectangle. However, it is appreciated that they may be shaped in other manner, for instance, a circle or oval.

Figure 7:
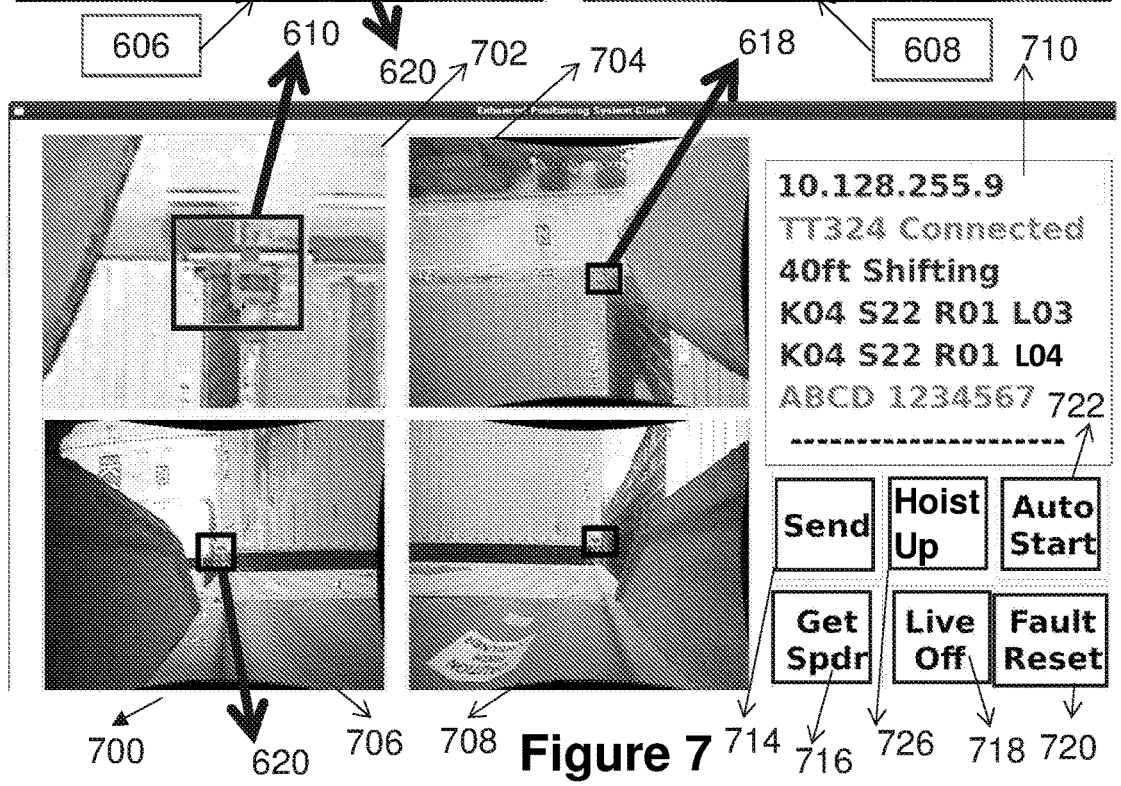
FIG. 7 illustrates a graphical user interface containing the images of FIG. 6 but with one of the images digitally zoomed/focused and a side panel with information and controls.

FIG. 7 is an example illustrating a graphical user interface 700 that may appear on the display of the remote personal computer 104 of FIG. 1 and/or the remote mobile device 106 of FIG. 1. FIG. 7 comprises 4 images 702, 704, 706, and 708 that correspond with the images 602, 604, 606, and 608 of FIG. 6 respectively. Images 704, 706 and 708 are identical to images 604, 606 and 608. Like FIG. 6, FIG. 7 shows the 4 boundaries 610, 618, and 620 of FIG. 6, including a fourth boundary in image 708. Images 702 is a zoomed in or focused view of image 602. In addition, FIG. 7 shows the following. A side panel 724 comprising a details portion 710 for showing details about the container 616. For instance, 10.128.255.9 is an Internet Protocol (IP) Address of a crane with reference number TT324 that is being operated on. A job order was sent to the IP Address of the crane and a crane operator was notified to operate the crane. The container 616 may have a reference number ABCD 1234567 and be of the type that is 40 feet long. The container 616 may be moved from a location, K04 S22 R01 L03, to another location, K04 S22 R01 L04. It is appreciated that other details not shown in FIG. 7 but are helpful in the typical crane operation can also be displayed.

- A "send" button 714 for sending position data of one or more markers for calculation/computation to derive the offset values or parameters that the crane spreader has to be adjusted in order to land on the container 616 to engage it.
- A "get spreader" button 716 for instructing capturing of one or more snapshots or images from the respective one or more cameras (for instance, cameras 114, 116, 118 and 120 of FIG. 1). as and when required by a crane operator.
- A "live off" button 718 for toggling between displaying the static image or images for user marking and a live/real-time video feed or stream of the site at which the crane operation is to be carried out. This advantageously provides the crane operator with an option to see what is going on at the site via the live video.
- A "fault reset" button 720 for clearing a fault that interrupts automatic movement of a crane that is being controlled. Whenever a system fault occurs, the crane is configured to stop movement at the crane's current position and controlling of further movement is disallowed. For instance, the crane may be stationary anywhere in the movement path of the crane. After the fault is resolved or that it is confirmed to be a false alarm, pressing the "fault reset" button 720 can clear the fault and allow the crane to be controlled again.
- An "auto start" button 722 for instructing the crane being controlled to continue from a previous crane action or to start a new action if there was no previous crane action to continue. For instance, if a fault occurred previously and caused the crane spreader to stop halfway in its movement path, the "auto start" button 722 can be pressed to instruct the crane spreader to continue moving along the movement path after the fault is cleared using the "fault reset" button 720.
- A "hoist up" button 726 for moving the crane spreader to a preferred position that is predetermined to be ideal or optimized for the respective one or more cameras (for instance, cameras 114, 116, 118 and 120 of FIG. 1) to capture one or more snapshots or images.

Figure 8:
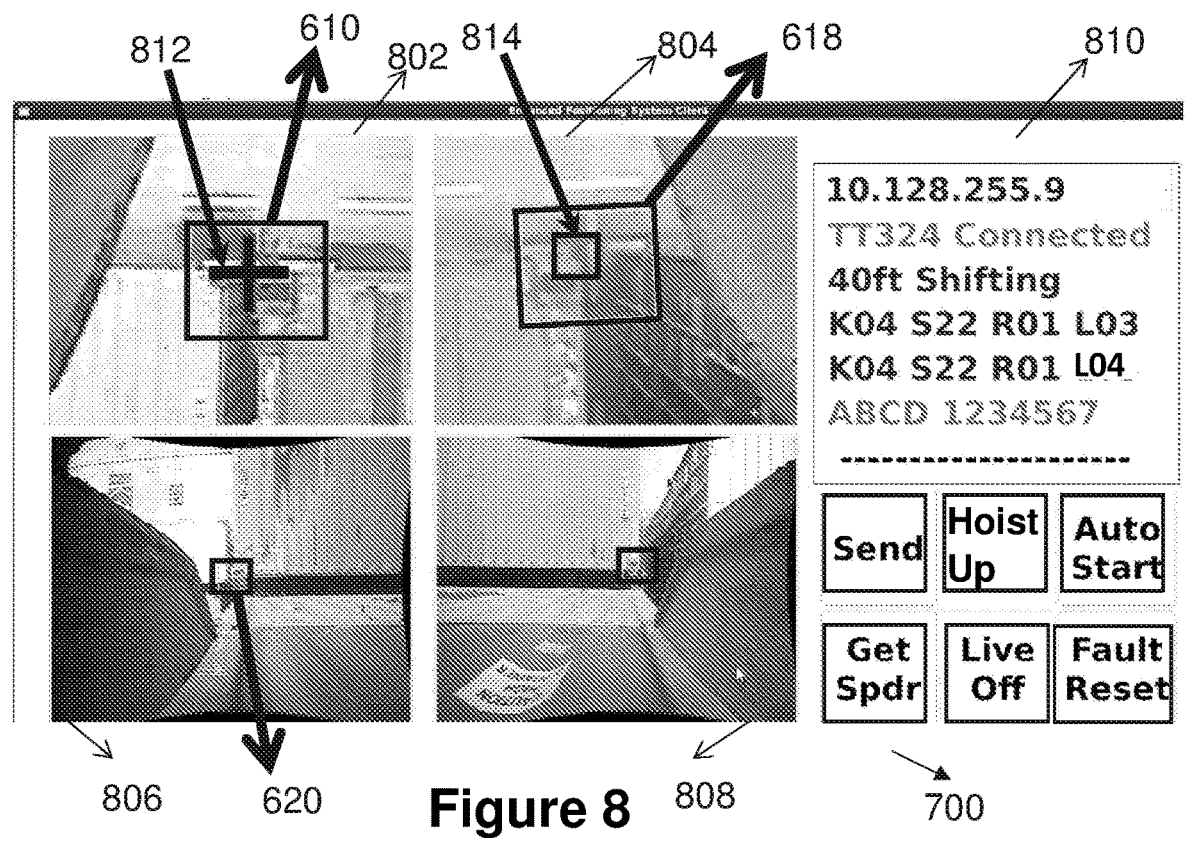
FIG. 8 illustrates a graphical user interface containing the images of FIG. 7 but with two of the images digitally zoomed/focused and a side panel with information and controls.

FIG. 8 shows the same graphical user interface 700 of FIG. 7 that may appear on the display of the remote personal computer 104 of FIG. 1 and/or the remote mobile device 106 of FIG. 1. FIG. 8 comprises 4 images 802, 804, 806, and 808 that correspond with the images 702, 704, 706, and 708 of FIG. 7 respectively. Images 806 and 808 are identical to images 706 and 708. However, images 802 and 804 are zoomed in or focused views of images 702 and 704. FIG. 8 also shows the same side panel 810 containing the same components as the side panel 724 in FIG. 7. Like FIG. 6 and FIG. 7, FIG. 8 shows the 4 boundaries 610, 618, and 620 of FIG. 6, including the fourth boundary of 608 of FIG. 6 that is found in image 808. In addition, FIG. 8 shows a marker 812 marked on the image 802 by a crane operator. This marker 812 would be used to calculate/compute the offset values for adjusting the crane spreader. In the example illustrated by FIG. 8, the image 804 contains a second boundary 814 in addition to the boundary 618 also found in FIGS. 6 and 7. The boundary 814 resides within a region surrounded by the boundary 618. In the present example, the boundary 814 only appears after the marker 812 is marked as the boundary 814 can be estimated based on the position of the marker 812. In other examples, the boundary 814 may only appear after zooming is performed on the respective image or the boundary 814 may appear together with the boundary 618. The boundary 814 is a more precise indicator of where exactly the crane operator should be marking a marker compared to the indication provided by the boundary 618. For instance, the boundary 814 may surround a region or area that is within tolerance or error limits such that if the user (i.e. crane operator) marks anywhere in the boundary 814, the crane spreader will have higher chance of landing successfully based on calculations/computations based on the user markings. If a marker is not accurately placed by a crane operator such as placed outside the boundary 814, the landing of the crane spreader may not be successful and a new marker may have to be provided by the crane operator again. The boundary 814 may also be generated by a computer/machine to guide a crane operator where he/she should be marking a marker in image 804 just like the boundary 618. Similarly, vision/imaging techniques are used to process the image 804 to generate the boundary 814. It is noted that second boundary 814 is an optional feature.

Although the second boundary 814 is described with reference to the example in FIG. 6 to 8, it is appreciates that all the other examples discussed with reference to other figures can also be configured to have such second boundary 814 as a more precise indicator of where exactly the crane operator should be marking a marker compared to boundaries such as the boundary 618, which surrounds more region or area.

For all the boundaries 610, 618, and 620 of FIG. 6, including the fourth boundary in image 808, and the boundary 814 (hereinafter "these boundaries"), if a crane operator did not mark within these boundaries, an error notification may be flashed on the display of the remote personal computer 104 of FIG. 1 and/or the remote mobile device 106 of FIG. 1 to request the crane operator to re-mark on the images. Each of these boundaries is meant to guide a crane operator to more easily mark each marker. These boundaries can be said to be suggestions offered by the computer/machine to facilitate placement of marker. However, it is possible that the computer/machine would fail to generate these boundaries to appear at the precise or accurate location in the image. In such cases, the crane operator should override the suggestions offered by the computer/machine. The crane operator may ignore the error notification flashed on the display by making selections via the graphical user interface 700 and continue with calculations/computation based on what the crane operator marked. In an alternative example, it is possible that the crane operator is unable to proceed when the error notification is flashed so as to prevent the crane operator from sending erroneous instructions on the adjustment of the crane spreader that would result in accidents or compromise safety on site. In this alternative example, these boundaries would act as a means of computer/machine assisted prevention of accidents due to human errors.

Although the graphical user interface 700 is described with reference to the example in FIG. 6 only in the present disclosure, it is appreciated that all the other examples discussed with reference to other figures can also have the same kind of graphical user interface 700, and have, for instance, the same overriding function available to the crane operator to override the boundary suggestions or the error notifications that disallow the crane operator from proceeding to send erroneous instructions on the adjustment of the crane spreader.

Figure 9:
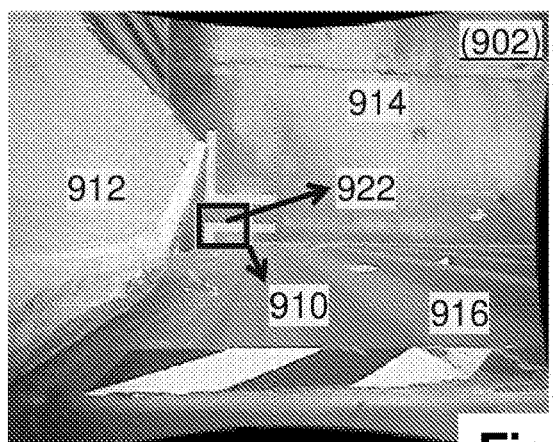
FIG. 9 shows another four captured static images with a boundary marking out a region comprising a ground marking in each image according to an example of the present invention.
Figure 9:
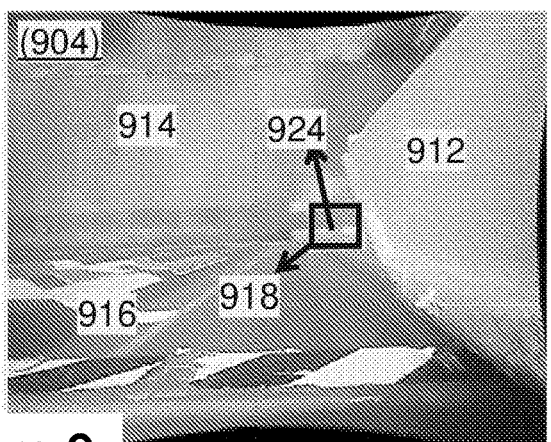
Figure 9:
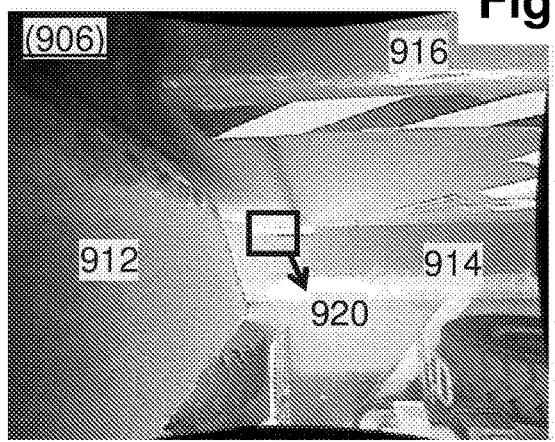
Figure 9:
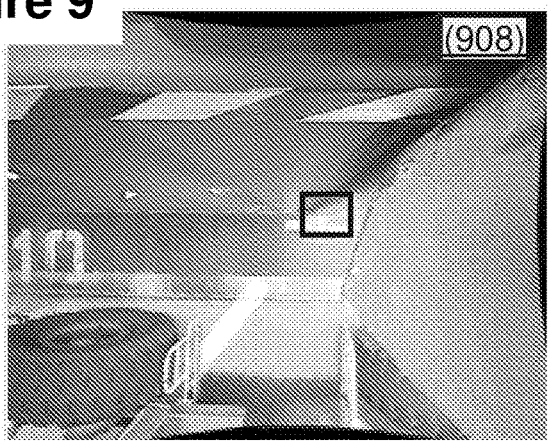

FIG. 9 shows 4 images 902, 904, 906, and 908 similarly captured and displayed on the display like the images 602, 604, 606 and 608 of FIG. 6 respectively. However, each image 902, 904, 906 and 908 captures a top view of a location or site on which a container 916 carried by a crane spreader 912 is to be placed. Specifically, the crane operation in the present example illustrated by FIG. 9 is to place the container 916 carried by a crane spreader 912 of a crane on a ground 914 comprising ground markings, for instance, 922 in image 902 and 924 in image 904. This crane operation is different from the crane operation to land a crane spreader on a container so as to lift or hoist it up and move it to another location that is described with reference to the earlier Figures.

Figure 10:
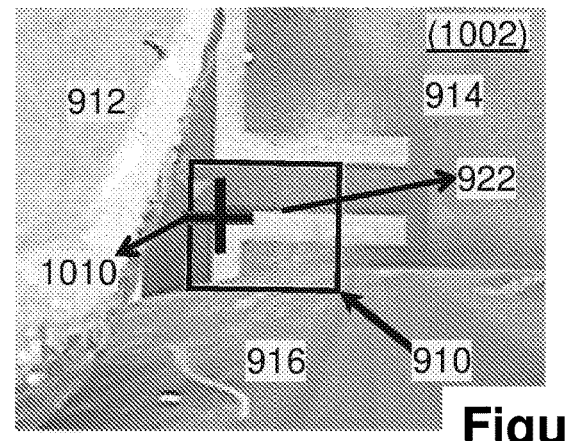
FIG. 10 shows the four captured static images of FIG. 9 but with two of the images digitally zoomed/focused to show user markings at a corner of the ground marking.
Figure 10:
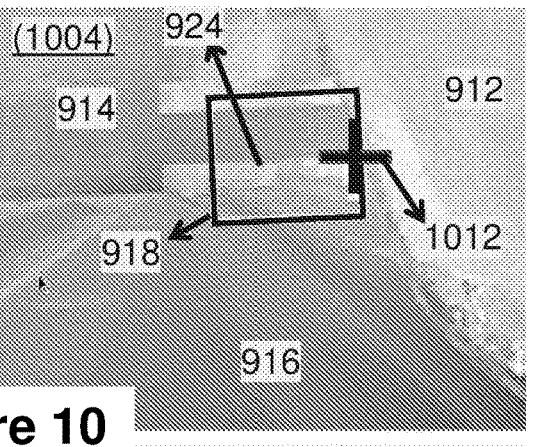
Figure 10:
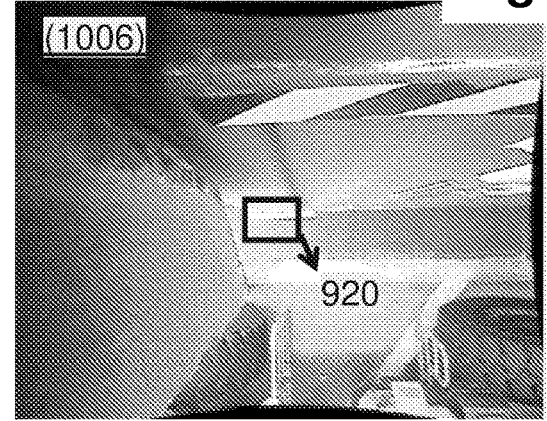
Figure 10:
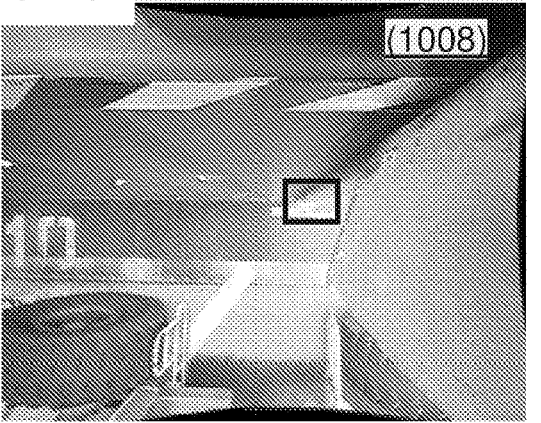

Each image 902, 904, 906 and 908 separately captures four corresponding sets of the ground markings. These ground markings mark out a container placement lot on the ground 914 for placing or stowing the container 916. In the present example, a crane operator places markers in the images 902 and 904 based on the ground markings 922 and 924. The ground markings 922 and 924 provide guidance to a crane operator to place markers in the respectively images 902 and 904. In this example, the ideal position to place a marker is at a corner of the ground marking in each image. FIG. 10 described later will provide more details on the marking. The markers are in turn used to calculate offset values or parameter for adjusting the crane spreader 912 carrying the container 916 to land the container 916 within the container placement lot marked out by the ground markings. The ground markings 922 and 924 are located at opposite corners of a longer side (i.e. length) of the container 916 when the container 916 is placed on the ground 914. The image 908 is deliberately presented without reference numerals and without any arrows except for its reference numeral 908 to illustrate how the actual image 908 would look like on the display of the remote personal computer 104 of FIG. 1 and/or the remote mobile device 106 of FIG. 1.

FIG. 9 also comprises 4 boundaries 910, 918, 920, and including a fourth boundary in the image 908. It is noted that such boundaries are optional features. These 4 boundaries 910, 918, 920 and the fourth boundary in the image 908, are generated by a computer/machine to guide a crane operator where he/she should be marking markers on each one of the respective images 902, 904, 906, and 908. A processor/processing unit of the computer/machine applying vision/imaging techniques is used to process each of the images 902, 904, 906, and 908 to determine location of corners of the ground markings in the respective images 902, 904, 906 and 908. Ground markings can be made to have similar design to facilitate detection via vision/imaging techniques. Furthermore, if each camera is physically mounted to capture images such that the ground markings would be located centrally, it would not be difficult to a skilled person to work out the vision/imaging technique to locate the ground markings in each image. Once the location of the corner of a ground marking is determined, the processor/processing unit of the computer/machine generates a boundary highlighting a region/area where the corner of the ground marking should be in the image. This boundary is indicative of where the crane operator should be placing a marker in the image. It is appreciated that the computer/machine may, for example, be one or more of the remote personal computer 104 of FIG. 1, the remote mobile device 106 of FIG. 1, the image processing personal computer 112 of FIG. 1 or the crane controller 122 of FIG. 1. In the present example, each boundary, including 910, 918, 920 and the fourth boundary in image 908, are shaped as a square or rectangle. However, it is appreciated that they may be shaped in other manner, for instance, a circle or oval.

FIG. 10 comprises 4 images 1002, 1004, 1006, and 1008 that correspond with the images 902, 904, 906, and 908 of FIG. 9 respectively. Images 1006 and 1008 are identical to images 906 and 908. Images 1002 and 1004 are zoomed in or focused views of images 902 and 904. FIG. 10 also shows the 4 boundaries 910, 918, and 920 of FIG. 9, including the fourth boundary in image 908 that is found in image 1008. In addition, FIG. 10 shows a marker 1010 marked on the image 1002 in the boundary 910 and another marker 1012 marked on the image 1004 in the boundary 918 by a crane operator. The markers 1010 and 1012 would be used to calculate/compute the offset values for adjusting the crane spreader 912. In the example of FIG. 10, the markers 1010 and 1012 should be ideally marked by the crane operator at a corner of the respective ground markings 922 and 924 that are present in each image 1002 and 1004 respectively so as to obtain most accurate positioning offset required to adjust the crane spreader 912 for landing the container 916 carried by the crane spreader 912 on the ground 914. Similar steps for derivation of offset values or parameter described previously with reference to FIG. 5 can be applied to derive the offset values for the example illustrated in FIG. 9 and FIG. 10. In this case, A1 and A2 will be opposite ends of a longer side (length) of the crane spreader 912 present together with the markers 1010 and 1012 in the images 1002 and 1004 respectively. T1 and T2 will be the opposite ends corresponding to the position of the markers 1010 and 1012 on the respective ground markings 922 and 924.

Figure 11:
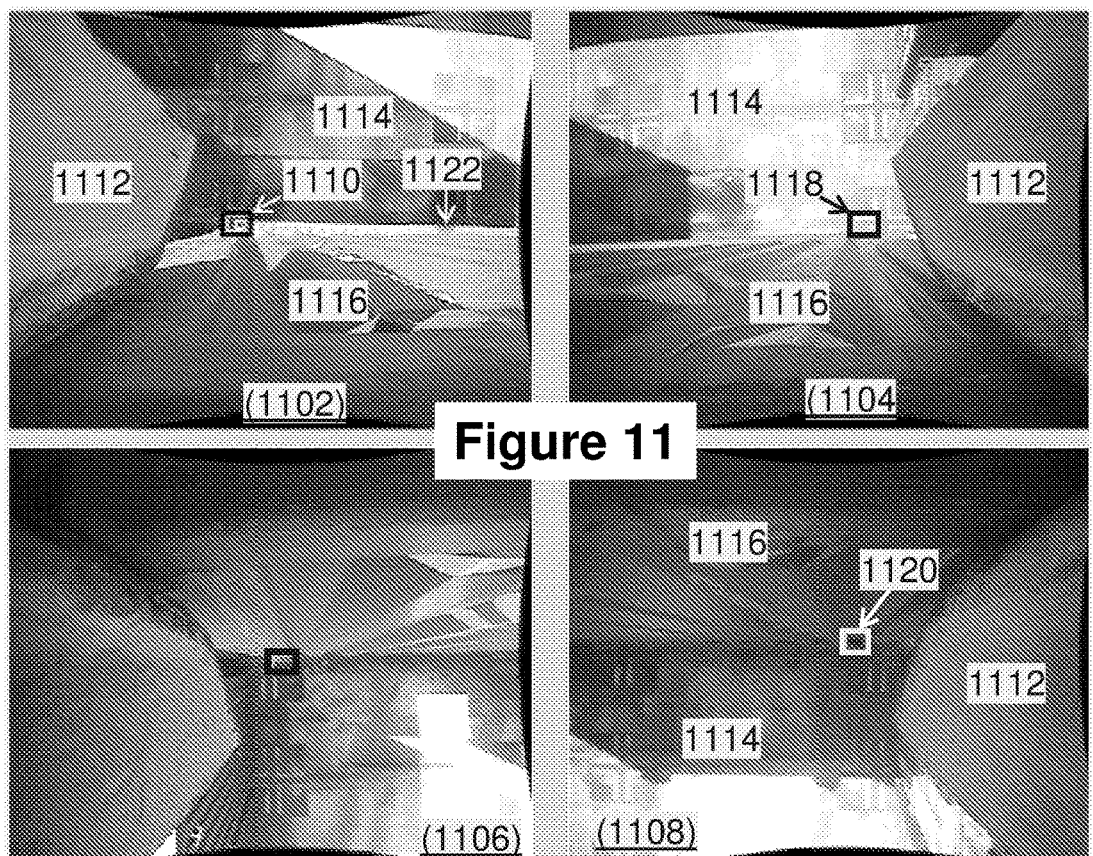
FIG. 11 shows another four captured static images with a boundary marking out a region comprising a corner casting in each image according to an example of the present invention.

FIG. 11 shows 4 images 1102, 1104, 1106, and 1108 similarly captured and displayed on the display like the images 1002, 1004, 1006 and 1008 of FIG. 10 respectively. However, each image 1102, 1104, 1106 and 1108 captures a top view of a location or site with a container 1122 on which a container 1116 carried by a crane spreader 1112 is to be placed. The container 1122 was previously placed on the ground 1114 of the location or site. The crane operation in this example is to place the container 1116 carried by the crane spreader 1112 onto the container 1122.

Each image 1102, 1104, 1106 and 1108 separately captures each of 4 corner castings of the container 1122 respectively. The images 1102 and 1104 contain opposite corners of a longer side (i.e. length) of the container 1122 in a top view of the container 1122. Similarly, the images 1106 and 1108 contain opposite corners of a longer side of the container 1122 in a top view of the container 1122.

Accordingly, the images 1102 and 1106 contain opposite corners of a shorter side (i.e. width) of the container 1122 in a top view of the container 1122. Similarly, the images 1104 and 1108 contain opposite corners of a shorter side (i.e. width) of the container 1122 in a top view of the container 1122. The image 1106 is deliberately presented without reference numerals and arrows to illustrate how the actual images 1102, 1104, 1106 and 1108 would look like on the display of the remote personal computer 104 of FIG. 1 and/or the remote mobile device 106 of FIG. 1. In all the images 1102, 1104, 1106 and 1108, part of the crane spreader 1112 is captured. Specifically, this part of the crane spreader 1112 can comprise a device for engaging the respective corner casting of the container 1122.

FIG. 11 illustrates 4 boundaries 1110, 1118, 1120, including a fourth boundary in image 1106. It is noted that such boundaries are optional features. These 4 boundaries, 1110, 1118, 1120 and the fourth boundary in the image 1106, are generated by a computer/machine to guide a crane operator where he/she should be marking markers on each one of the respective images 1102, 1104, 1106, and 1108. A processor/processing unit of the computer/machine applying vision/imaging techniques is used to process each of the images 1102, 1104, 1106, and 1108 to determine location of each corner casting of the container 1122 in the respective images 1102, 1104, 1106 and 1108. Corner castings all have rather similar design and that facilitates detection via vision/imaging techniques. Furthermore, if each camera is physically mounted to capture images such that the corner casting in the container would be located centrally, it would not be difficult to a skilled person to work out the vision/imaging technique to locate the corner casting in each image. Once the location of each corner casting is determined, the processor/processing unit of the computer/machine generates a boundary highlighting a region/area where the corner casting should be in the image. This boundary is also indicative of where the crane operator should be making markings in the image. It is appreciated that the computer/machine may, for example, be one or more of the remote personal computer 104 of FIG. 1, the remote mobile device 106 of FIG. 1, the image processing personal computer 112 of FIG. 1 or the crane controller 122 of FIG. 1. In the present example, each boundary, including 1110, 1118, 1120 and the fourth boundary in image 1106, are shaped as a square or rectangle. However, it is appreciated that they may be shaped in other manner, for instance, a circle or oval.

Figure 12:
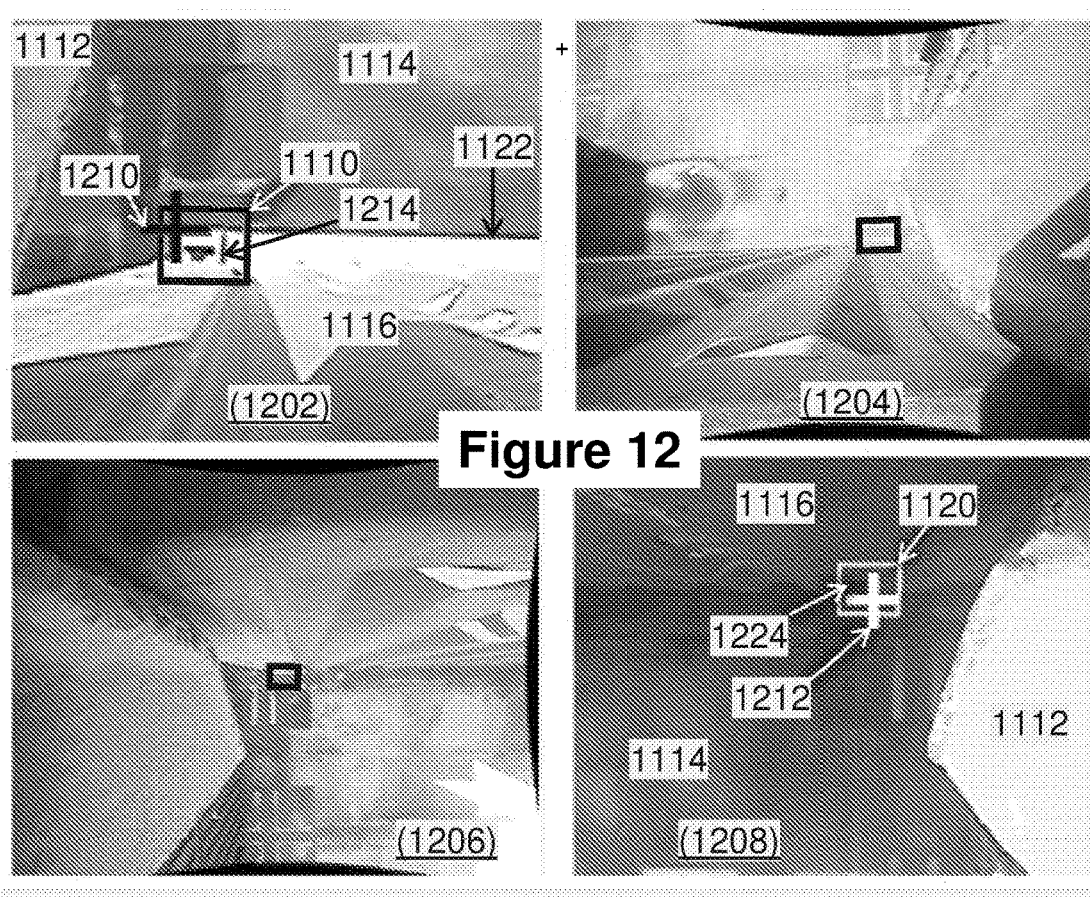
FIG. 12 shows the four captured static images of FIG. 11 but with two of the images digitally zoomed/focused to show user markings at a corner of the corner casting.

FIG. 12 comprises 4 images 1202, 1204, 1206, and 1208 that correspond with the images 1102, 1104, 1106, and 1108 of FIG. 11 respectively. Images 1204 and 1206 are identical to images 1104 and 1106. Images 1202 and 1208 are zoomed in or focused views of images 1102 and 1108. FIG. 12 also shows the 4 boundaries 1110, 1118, and 1120 of FIG. 11, including the fourth boundary in image 1108 that is found in image 1208. In addition, FIG. 12 shows a marker 1210 marked on the image 1102 in the boundary 1110 and another marker 1212 marked on the image 1208 in the boundary 1120 by a crane operator. The markers 1210 and 1212 would be used to calculate/compute the offset values for adjusting the crane spreader. In the example of FIG. 12, the markers 1210 and 1212 should be ideally marked by the crane operator at a corner of each corner casting 1214 and 1224 that are present in each image 1202 and 1208 respectively so as to obtain most accurate positioning offset required to adjust the crane spreader 1112 for landing the container 1116 carried by the crane spreader 1112 on the container 1122 that was previously placed on the ground 1114.

It is noted that the images 1202 and 1208 containing the markers 1210 and 1212 respectively show diagonally opposite ends of the container 1122. In this case, similar steps for derivation of offset values or parameter described previously with reference to FIG. 5 can be applied. However, in this case, A1 and A2 will be diagonally opposite ends of a longer side (length) of the crane spreader 1112 present together with the markers 1210 and 1212 in the images 1202 and 1208 respectively. T1 and T2 will be the diagonally opposite ends of the container 1116 corresponding to the position of the markers 1210 and 1212 in the images 1202 and 1208 respectively.

Figure 13:
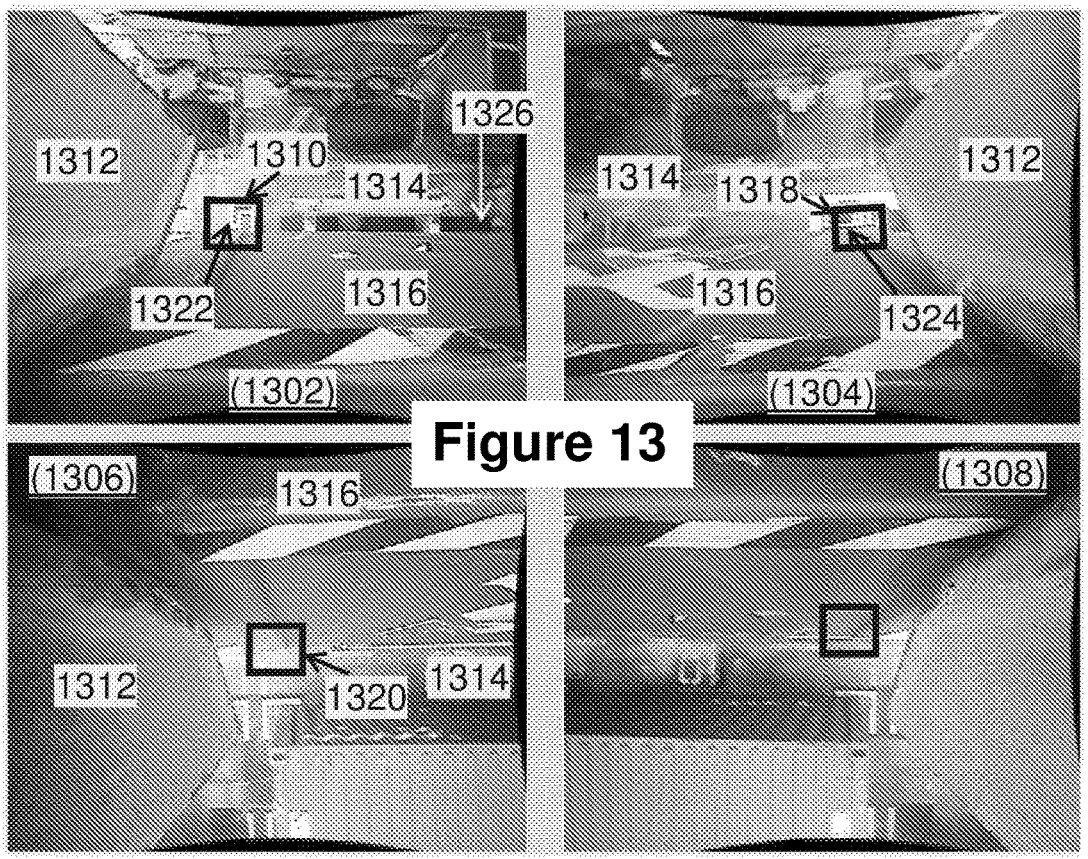
FIG. 13 shows another four captured static images with a boundary marking out a region comprising a trailer (chassis) alignment corner in each image according to an example of the present invention.
Figure 14:
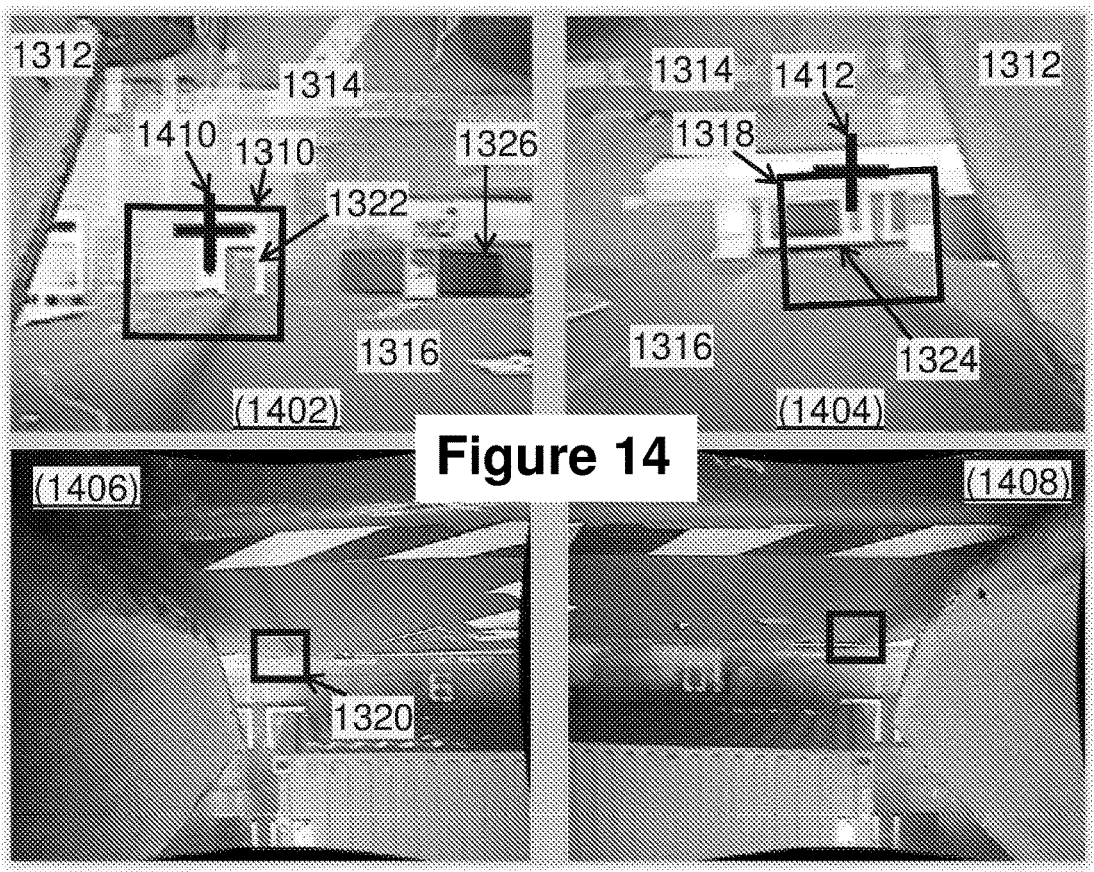
FIG. 14 shows the four captured static images of FIG. 13 but with two of the images digitally zoomed/focused to show user markings at a corner of the trailer (chassis) alignment corner.

FIG. 13 shows another four captured static images with a boundary marking out a region comprising a trailer (chassis) alignment corner in each image according to an example of the present invention. FIG. 14 shows the four captured static images of FIG. 13 but with two of the images digitally zoomed/focused to show user markings at a corner of the trailer (chassis) alignment corner.

FIG. 13 shows 4 images 1302, 1304, 1306, and 1308 similarly captured and displayed on the display like the images 1202, 1204, 1206 and 1208 of FIG. 12 respectively. However, each image 1302, 1304, 1306 and 1308 captures a top view of a location or site with a trailer (also known as "chassis") 1326 on which a container 1316 carried by a crane spreader 1312 is to be placed. The trailer 1326 was previously located to the ground 1314 of the location or site. The crane operation in this example is to place the container 1316 carried by the crane spreader 1312 on the trailer 1326.

Each image 1302, 1304, 1306 and 1308 aims to separately capture images of landing guides, such as landing guides 1322 and 1324, extending or mounted to the trailer 1326. In this example, the trailer 1326 only has two visible landing guides 1322 and 1324 as shown in images 1302 and 1304 respectively. There are actually two other landing guides on the trailer 1326 but they are obstructed by the container 1316 in the images 1306 and 1308 and are not visible. In some other examples, all four landing guides of a typical trailer can be visible in all four images. Hence, for the present example, the images 1306 and 1308 will not be used for deriving offset values for adjusting the crane spreader 1312. These landing guides 1322 and 1324 guide a crane operator how the container 1316 can be placed on the trailer 1326. Generally, a minimum of two landing guides should be present on the trailer and visible in the images for the user marking procedure to derive offset values of the crane spreader 1312. In the present example, the crane operator places markers in the images 1302 and 1304 based on the landing guides 1322 and 1324. In this example, the ideal position to place a marker is at a specific corner of each landing guide 1322 and 1324 in each of the images 1302 and 1304 respectively. FIG. 14 described later will provide more details on the marking. The markers are in turn used to calculate offset values or parameter for adjusting the crane spreader 1312 carrying the container 1316 to land the container 1316 on the trailer 1326. The landing guides 1322 and 1324 of the trailer 1326 are located at opposite corners of a longer side (i.e. length) of the container 1316 when the container 1316 is placed on the trailer 1326. The image 1308 is deliberately presented without reference numerals and without any arrows except for its reference numeral 1308 to illustrate how the actual image 1308 would look like on the display of the remote personal computer 104 of FIG. 1 and/or the remote mobile device 106 of FIG. 1.

FIG. 13 also comprises 4 boundaries 1310, 1318, 1320, and including a fourth boundary in the image 1308. It is noted that such boundaries are optional features. These 4 boundaries 1310, 1318, 1320 and the fourth boundary in the image 1308, are generated by a computer/machine to guide a crane operator where he/she should be marking markers on each one of the respective images 1302, 1304, 1306, and 1308. A processor/processing unit of the computer/machine applying vision/imaging techniques is used to process each of the images 1302, 1304, 1306, and 1308 to determine potential location of the landing guides 1322 and 1324 of the trailer 1326 in the respective images 1302, 1304, 1306 and 1308. Landing guides can be made to have similar design to facilitate detection via vision/imaging techniques. Furthermore, if each camera is physically mounted to capture images such that the landing guides would be located centrally, it would not be difficult to a skilled person to work out the vision/imaging technique to locate the landing guides in each image. Once the location of the landing guide is determined, the processor/processing unit of the computer/machine generates a boundary highlighting a region/area where the landing guide should be in the image. This boundary is indicative of where the crane operator should be placing a marker in the image. It is appreciated that the computer/machine may, for example, be one or more of the remote personal computer 104 of FIG. 1, the remote mobile device 106 of FIG. 1, the image processing personal computer 112 of FIG. 1 or the crane controller 122 of FIG. 1. In the present example, each boundary, including 1310, 1318, 1320 and the fourth boundary in image 1308, are shaped as a square or rectangle. However, it is appreciated that they may be shaped in other manner, for instance, a circle or oval.

FIG. 14 comprises 4 images 1402, 1404, 1406, and 1408 that correspond with the images 1302, 1304, 1306, and 1308 of FIG. 13 respectively. Images 1406 and 1408 are identical to images 1306 and 1308. Images 1402 and 1404 are zoomed in or focused views of images 1302 and 1304. FIG. 14 also shows the 4 boundaries 1310, 1318, and 1320 of FIG. 13, including the fourth boundary in image 1308 that is found in image 1408. In addition, FIG. 14 shows a marker 1410 marked on the image 1402 in the boundary 1310 and another marker 1412 marked on the image 1404 in the boundary 1318 by a crane operator. The markers 1410 and 1412 would be used to calculate/compute the offset values for adjusting the crane spreader 1312. In the example of FIG. 14, the markers 1410 and 1412 should be ideally marked by the crane operator at a designated position of the landing guides 1322 and 1324 that are present in each image 1402 and 1404 respectively so as to obtain most accurate positioning offset required to adjust the crane spreader 1312 for landing the container 1316 carried by the crane spreader 1312 on the trailer 1326. Similar steps for derivation of offset values or parameter described previously with reference to FIG. 5 can be applied to derive the offset values for the example illustrated in FIG. 13 and FIG. 14. In this case, A1 and A2 will be opposite ends of a longer side (length) of the crane spreader 1312 present together with the markers 1410 and 1412 in the images 1402 and 1404 respectively. T1 and T2 will be the opposite ends corresponding to the position of the markers 1410 and 1412 on the respective landing guides 1322 and 1324 of the trailer 1326.

The arrangements/setups to get the one or more cameras (for example, 114, 116, 118 and 120 in FIG. 1) ready for remote crane control operation that involves user (i.e. crane operator) markings on images according to the present disclosure are as follows. These arrangements/setups are applicable to all the examples described in the present disclosure.

It is assumed that all the cameras are already strategically mounted on at least one corner of a crane spreader for taking snapshots or static images of corner castings of a target container already on the ground, corner castings of a target container on top of another container, corner castings of a target container on a trailer, from landing guides of a trailer or ground markings on the ground.

1. A height of the crane spreader from the corner castings of a target container already on the ground, corner castings of a target container on top of another container, corner castings of a target container on a trailer, from landing guides of a trailer or ground markings on the ground is first determined by scanning with, for example, a laser sensor. The height determined in this manner is used for calculating how far a crane spreader should move towards or away from the corner castings of the target container, the ground, or the trailer.

2. A crane automation algorithm will then be activated to move the crane spreader to a predetermined height, for instance, about 4 m above the corner castings of the target container, the ground, or the trailer.

In the case of the target container is already on the ground, the case of the target container on top of another container and the case of the target container on top of a trailer, the one or more camera is adjusted to the predetermined height such that only one corner casting of the respective target container can be captured and the corner casting can be seen in the image to be captured. Preferably, the corner casting is captured such that it is at the center of the image. Each camera of the crane spreader should be mounted with the objective to have the corner casting captured in the center of captured images. Capturing the corner casting in the center of the image may facilitate use of optical zoom of the camera to get a clear zoom in or focused view of the corner casting.

In the case of capturing of ground markings on the ground, the one or more camera is adjusted to the predetermined height such that only one corner ground marking of a container placement lot can be captured and the corner ground marking can be seen in the image to be captured. Preferably, the corner ground marking is captured such that it is at the center of the image. Each camera of the crane spreader should be mounted with the objective to have the corner ground marking captured in the center of captured images. Capturing the corner ground marking in the center of the image may facilitate use of optical zoom of the camera to get a clear zoom in or focused view of the corner ground marking.

In the case of capturing of landing guides of the trailer on the ground, the one or more camera is adjusted to the predetermined height such that only one landing guide of the trailer can be captured and the landing guide can be seen in the image to be captured. Preferably, the landing guide is captured such that it is at the center of the image. Each camera of the crane spreader should be mounted with the objective to have the landing guide captured in the center of captured images. Capturing the landing guide in the center of the image may facilitate use of optical zoom of the camera to get a clear zoom in or focused view of the landing guide.

3. A crane movement sensor will then sense the movement of the crane spreader until the crane spreader has come to a complete stop with no swaying, no substantial swaying or tolerable swaying that will not affect clarity of the images to be captured using the one or more cameras mounted on the crane spreader. In one example, the crane movement sensor transmits signals/data relating to the movement/motion of the crane spreader to the crane controller 122 of FIG. 1. The crane controller 122 of FIG. 1 processes the signals/data to determine whether there is swaying/movement of the crane spreader or whether the swaying/movement is within tolerable movement range.

4. When there is no swaying/movement of the crane spreader or that the swaying/movement is within the tolerable movement range, a snap shot or static image is taken by the one or more cameras mounted on the crane spreader. The image captured in the snap shot will be transmitted for marking of corners by a crane operator. In one example, the crane controller 122 of FIG. 1 instructs the image processing personal computer 112 of FIG. 1 to activate the one or more cameras to capture the snap shot or static image after the crane controller 122 of FIG. 1 determines whether there is swaying/movement of the crane spreader or that the swaying/movement is within the tolerable movement range.

The above described apparatus and method for remote crane control that still involves a human crane operator can either replace fully automated crane control system that is non-human driven or coexist with it. For example, for efficient container moving operations, there are several scenarios in which the above described apparatus and method for remote crane control that still involves a human crane operator can be utilised together with a fully automated crane control system that is non-human driven.

For a job of placement of a container onto ground, a container carrier (also known as container chassis or trailer) another container or a container stack, a fully automated crane control system may automatically cease operation to transfer control to the above described apparatus for remote crane control that still involves a human crane operator under the following conditions.

Crane Operation—Pick Up a Container from a Yard

Transfer of control to the apparatus for remote crane control takes place in the following situations.

The container number obtained from a container in the yard does not tally with the container number recorded in an electronic job order to pick up a container.

The container to be picked up is placed in the yard out of alignment that exceeds tolerance limits. For instance, the container is placed outside ground markings of container placement lots.

The container corner castings of the container to be picked up cannot be detected by the cameras mounted to the crane spreader for the crane spreader to land on.

The crane encounters a fault during the automatic lowering motion of the crane spreader.

The crane spreader is not able to land accurately onto the container automatically.

The crane spreader lands correctly onto the container but was unable to lock successfully to engage the corner castings of the container (for example, twistlock is jammed).

Crane Operation—Pick Up a Container from a Trailer (Chassis)

Transfer of control to the apparatus for remote crane control takes place in the following situations.

1. The vehicle number of the vehicle joint to the trailer carrying the container to be picked up that is obtained from the yard does not tally with the vehicle number of the trailer recorded in an electronic job order to pick up the container on the trailer.

2. The vehicle joint to the trailer carrying the container to be picked up is parked out of alignment that exceeds tolerance limits in the yard. For instance, the vehicle is parked outside ground markings of a parking lot for the vehicle.

3. The container number obtained from a container in the trailer does not tally with the container number recorded in an electronic job order to pick up a container.

4. The container to be picked up is positioned out of alignment that exceeds tolerance limits.

5. The container corner castings of the container to be picked up cannot be detected by the cameras mounted to the crane spreader for the crane spreader to land on.

6. The crane encounters a fault during the automatic lowering motion of the crane spreader.

7. The crane spreader is not able to land accurately onto the container automatically.

8. The crane spreader lands correctly onto the container but was unable to lock successfully to engage the corner castings of the container (for example, twistlock is jammed).

Crane Operation—Landing a Container onto Ground or a Container Stack in a Yard

Transfer of control to the apparatus for remote crane control takes place in the following situations.

1. A situation of landing a container onto ground in which no container is beneath the crane spreader is present to take reference for a crane operator to place markers in the captured images of the location or site. In this case, user markings at the right location will be useful for the crane to place the container. For instance, a right location can be at a corner ground marking of a container placement lot on the ground. If there are no ground markings, the crane operator can make markings on the visible ground beneath the crane spreader in the image based on his/her experience.

2. Alignment of the container stack comprising one or more containers beneath the crane spreader in the yard is out of a tolerance range that can be handled by the fully automated crane and user markings would be useful as guidance.

3. The container stack or ground cannot be detected by the sensors on board the fully automated crane, which may include laser sensors.

4. The crane encounters a fault during the automatic lowering motion towards the container stack or the ground.

5. The crane spreader lands correctly onto the container stack but was unable to unlock from the corner castings of the container carried by the crane spreader successfully (for example, twistlock is jammed).

Crane Operation—Landing a Container onto a Trailer (Chassis)

Transfer of control to the apparatus for remote crane control takes place in the following situations.

1. A non-standard vehicle and/or a non-standard trailer is detected by a crane trailer (chassis) alignment laser sensor.

2. The vehicle number of the vehicle joint to the trailer for landing a container carried by the crane spreader that is obtained from the yard does not tally with the vehicle number of the trailer recorded in an electronic job order to land the container on the trailer.

3. The vehicle joint to the trailer for landing the container is parked out of alignment that exceeds tolerance limits in the yard. For instance, the vehicle is parked outside ground markings of a parking lot for the vehicle.

4. The vehicle structure, more specifically, the landing guides of the trailer, cannot be detected by the cameras.

5. The crane encounters a fault during the automatic lowering motion towards the trailer.

6. The crane spreader lands correctly onto the trailer but was unable to unlock successfully from the trailer (for example, twistlock is jammed)

In the above scenarios, several on-site images can be taken. With the human crane operator around, and with the help of user input markings, some of the situations in which the machine fails may be resolved safely without full reliance on the machine. In situations where there are no ground markings, no landing guides of trailer, or computer/machine assistance provided such as the computer/machine generated boundaries surrounding a suggested region/area a crane operator should mark, the crane operator may rely on experience to input markers for the derivation of the offset values to adjust the positioning of the crane spreader for completing the crane operation.

Advantages of the apparatus described with reference to the figures may include the following.

There will be shorter training duration for new operators to learn to mark corners of corner castings in a container, mark corners of ground markings, mark over landing guides of a trailer, or in the case of no reference on site, to estimate where to make markings in images, compared to controlling a crane spreader with the known setup comprising a joystick and buttons on a console. In some ports, a new operator typically needs to attend 5 weeks of training before he/she is allowed to operate a crane independently. With the use of the apparatus and its examples described in the present disclosure, a new operator only needs to identify and mark corners of an image of a container to indicate a landing position of a crane spreader. This relative simplicity in workflow means that the training duration for new operators can be reduced to say, about 1 week, which is a significant 80% reduction in training time.

There will be shorter time taken to mark, for instance, 2 corners on an image or on more than one separate images, which takes about 15 seconds, compared to known manual control of a crane spreader with a joystick, which takes about 60 or 70 seconds. The average handling time to engage a crane spreader to a container is thus reduced by about 78%.

This greatly improves the productivity of each crane operator, reduces manpower requirement, and may translate to a lower salary cost incurred by each port for each crane operator.

Compared to transmission of video in real-time for existing remote crane control, which will require a bandwidth of about 15 MBps throughout a 60 or 70 seconds duration in the case of remote control using the known setup comprising a joystick in a control center, transmitting a static image (photograph) only requires say about 5 MB and takes say about 2 seconds. The large bandwidth requires the control center to be located close to the site of the cranes. However, in the case of the smaller data footprint required for just transmitting a static image, it will allow the control center and the crane operators to be located further offsite, or even overseas. Due to lower bandwidth requirement, the application can be extended to some Rubber Tyre Gantry Cranes which are running on wireless communications.

The low bandwidth requirement is also more suited for implementing on hand held devices. In existing remote control centers, sophisticated equipment, including dedicated programmable logic controllers are required for each console. The need for a wired network to provide consistent high reliability is no longer a pre-requisite. The apparatus and its examples described in the present disclosure have much simpler and lower cost infrastructure setup as compared to the existing console with a joystick that support remote control operations. The simplicity of marker inputs on static images requires just, for instance, a touch screen mobile device as the new console for the remote crane operator.

Furthermore, through the images received, the operator can check the environment from the images to ensure nobody is close to the crane operation area when the crane is in operation and this ensures human safety. It would require costly infrastructure setup for a fully automated system to check the surrounding environment for human safety, not to mention that such system may also fail now and then due to equipment wear and tear.

As there is semi-automation in terms of computer calculated positioning, precision in the movement of the crane spreader is ensured when aligning it to land or engage a container. There is less dependence on human's skill in this aspect, which may take time to acquire or perfect. In the case of providing the feature of the computer/machine generated boundaries surrounding a suggested region/area a crane operator should mark, it is a form of prevention of human error in the marking of markers. Hence, erroneous instructions to a crane spreader from a crane operator that may cause accidents can be prevented. This is deemed to be a vast improvement compared to current crane control operations in which the crane operator may make a judgement error when he is controlling the crane spreader with a joystick.

The network switches 108 and 110 of FIG. 1, each also called a switching hub, bridging hub, Media Access Control (MAC) bridge, a router and the like, may be a computer networking device that connects devices together on a computer network by using packet switching to receive, process, and forward data to a destination device. In some examples according to the present disclosure, the network switches 108 and 110 may each be a server apparatus 1550 as illustrated schematically in FIG. 15, or have functionality to perform as a server distributed across multiple server components. A purpose of the network switches 108 and 110 in FIG. 1 is to relay data communications between the image processing personal computer 112 and both the remote personal computer 104 and the remote mobile device 106 of FIG. 1. Another purpose of the network switches 108 and 110 in FIG. 1 is to relay data communications between the crane controller 122 of FIG. 1 and both the remote personal computer 104 and the remote mobile device 106 of FIG. 1. It is appreciated that the image processing personal computer 112 may also be a server apparatus like the server apparatus 1550 of FIG. 15. It is appreciated that the network switches 108 and 110 may be one and the same network device or comprise several network devices.

In the example of FIG. 15, the server apparatus 1550 may comprise a number of individual components including, but not limited to, microprocessor 1556, a memory 1558 (e.g. a volatile memory such as a Random Access Memory (RAM)) for the loading of executable instructions 1560, the executable instructions defining the functionality the server apparatus 1550 carries out under control of the processor 1556. The server apparatus 1550 also comprises a network module 1552 allowing the server to communicate over the communications network 1512 (for example the internet). User interface 1562 may be provided for user interaction and may comprise, for example, conventional computing peripheral devices such as display monitors, computer keyboards and the like. The server apparatus 1550 may also comprises a database 1554. It should also be appreciated that the database 1554 may not be local to the server apparatus 1550. The database 1554 may be a cloud database.

The image processing personal computer 112 of FIG. 1 and the remote personal computer 104 of FIG. 1 may each be a computer 1504 that comprises a processing unit 1502 for processing one or more computer programs. The processing unit 1502 may be connected to input/output devices as required, such as a computer mouse 1536, keyboard/keypad 1504, a display 1508 (computer monitor, which may have touchscreen capabilities), headphones or microphones 1526 (required for VoIP application, where necessary, for instance, to make announcement at a crane operated site or seek assistance), one or more video/static camera 1540 (e.g. 114, 116, 118 and 120 of FIG. 1) and the like via Input/Output (I/O) interfaces 1524. The processing unit 1502 may include a processor 1518, a Random Access Memory (RAM) 1520 and a Read Only Memory (ROM) 1522. The components of the processing unit 1502 typically communicate via an interconnected bus 1528 and in a manner known to the person skilled in the relevant art. The computer 1504 may also comprise a database 1530. It should also be appreciated that the database 1530 may not be local to the computer 1504.

The processing unit 1502 may be connected to the network 1512, for instance, the Internet, via a suitable transceiver device 1514 (i.e. a network interface) or a suitable wireless transceiver 1532, to enable access to e.g. the Internet or other network systems such as a wired Local Area Network (LAN) or Wide Area Network (WAN). The processing unit 1502 of the computing device 1500 may also be connected to one or more external wireless communication enabled electronic devices 1534 (hereinafter "mobile device") or the server 1550 through the respective communication links 1580, 1582, 1584 via the suitable wireless transceiver device 1532 e.g. a WiFi transceiver, Bluetooth module, Mobile telecommunication transceiver suitable for Global System for Mobile Communication (GSM), 3G, 3.5G, 4G telecommunication systems, or the like.

The remote mobile device 106 of FIG. 1 may be the mobile device 1534, which can be, for example, a smart phone, tablet device, and other handheld device. The mobile device 1534 may be able to communicate through other communications network, such as, wired network, mobile telecommunication networks, but these are omitted from FIG. 15 for the sake of clarity.

The mobile device 1534 may comprise a number of individual components including, but not limited to, microprocessor 1576, a memory 1548 (e.g. a volatile memory such as a RAM) for the loading of executable instructions 1570, the executable instructions defining the functionality the mobile device 1534 carries out under control of the processor 1576. The mobile device 1534 also comprises a network module 1572 allowing the mobile device 634 to communicate over the communications network 1512. User interface 1592 is provided for user interaction and control that may be in the form of a touch panel display and presence of a keypad may be possible as it is also prevalent in many smart phone and other handheld devices. The mobile device 1534 may also comprise a database 1574. It should also be appreciated that the database 1574 may not be local to the mobile device 1534. The database 1574 may be a cloud database. The mobile device 1534 may include a number of other Input/Output (I/O) interfaces as well but they may be for connection with headphones or microphones 1594 (required for VoIP application, where necessary, for instance, to make announcement at a crane operated site or to seek assistance), Subscriber identity module (SIM) card 1596, flash memory card 1598, USB based device 1599, and the like, which are known for mobile device usage.

The server apparatus 1550, the computer 1504 and the mobile device 1534 may each comprise software, one or more computer programs and applications, for example, one or more software applications for e.g. instant messaging platform, audio/video playback, internet accessibility, working as operating system, network security, file accessibility, database management, which are applications typically equipped on a desktop or portable (mobile) device. The software, one or more computer programs and applications may be supplied to a user of the server apparatus 1550, the computer 1504 and/or the mobile device 1534 encoded on a data storage medium such as a CD-ROM, on a flash memory carrier or a Hard Disk Drive, and are to be read using a corresponding data storage medium drive of, for instance, the database 1530, which is configured as a storage device. Such software, one or more computer programs and applications may also be downloaded from the network 612. The instructions of the software, one or more computer programs and applications are read and controlled in its execution by the respective microprocessor 1556, processor 1518 and microprocessor 1576 (each of these processors/microprocessors may also be known as "processing unit"). Intermediate storage of program data may be accomplished using respective RAM 1558, 1520 and 1548.

Furthermore, one or more of the steps of the software, one or more computer programs and applications may be performed in parallel rather than sequentially. Each of the software, one or more computer programs and applications may be stored on any machine or computer readable medium that may be non-transitory in nature. The computer readable medium may include storage devices such as magnetic or optical disks, memory chips, or other storage devices suitable for interfacing with a general purpose computer or mobile device. The machine or computer readable medium may also include a hard-wired medium such as those exemplified in the Internet system, or wireless medium such as those exemplified in a Wireless LAN (WLAN) system. The software, one or more computer programs and applications when loaded and executed on a general-purpose computer or mobile device with computing capabilities effectively results in an apparatus that implements steps of the methods in examples herein described, for example, the calculation/computation steps to generate the offset values for adjusting the crane spreader.

As a summary, examples of the present disclosure may have the following features.

An apparatus (e.g. 104 and 106 of FIG. 1) for remote crane control, the apparatus comprising: a memory for storing instructions; and a processing unit (e.g. 1518 or 1576 of FIG. 15) configured to execute the instructions stored in the memory to control the apparatus to: receive one or more images (e.g. 302 to 308 of FIG. 3, 402 to 408 of FIG. 4, 602 to 608 of FIG. 6, 702 to 708 of FIG. 7, 802 to 808 of FIG. 8, 902 to 908 of FIG. 9, 1002 to 1008 of FIG. 10, 1102 to 1108 of FIG. 11, 1202 to 1208 of FIG. 12, 1302 to 1308 of FIG. 13 and 1402 to 1408 of FIG. 14) comprising a view of a location on which a crane spreader (e.g. 312 of FIG. 3, 418 of FIG. 4, 612 of FIG. 6, 912 of FIG. 9, 1112 of FIG. 11, and 1312 of FIG. 13) is to land; display the one or more images on a display (e.g. the display of 104 and 106 of FIG. 1); receive user input to mark one or more markers (e.g. 410 and 420 of FIG. 4, 812 of FIG. 8, 1010 and 1012 of FIG. 10, 1210 and 1212 of FIG. 12, and 1410 and 1412 of FIG. 14) on the one or more received images to facilitate landing of the crane spreader; and transmit position data of the one or more markers in the one or more received images to a processor (e.g. a processor or processing unit of the remote personal computer 104, the remote mobile device 106, the image processing personal computer 112 and/or the crane controller 122) for determining values defining positioning of the crane spreader relative to the position data of the one or more markers to offset so that the crane spreader proceeds to land based on the determined values.

The one or more images may be captured by at least one imaging device (e.g. 114 to 120 of FIG. 1) mounted on the crane spreader and the at least one imaging device is configured to capture the one or more images at a predetermined distance from a surface (e.g. top of another container, ground, or top of a trailer) beneath the crane spreader that is closest to the at least one imaging camera.

The apparatus may be further controlled to display at least one boundary (e.g. 610, 618 and 620 of FIG. 6, 910, 918 and 920 of FIG. 9, 1110, 1118 and 1120 of FIG. 11, and 1310, 1318 and 1320 of FIG. 13) in the one or more images to suggest that the user should mark somewhere in the at least one boundary.

The apparatus may be further controlled to display a boundary (e.g. 814 in FIG. 8) within the at least one boundary (e.g. 618 in FIG. 8) to suggest that the user should mark somewhere in the boundary within the at least one boundary.

If one or more markers is not marked within the boundary, an action to notify the user may be performed (e.g. error notification).

Each of the one or more images may be a static image.

The crane spreader (e.g. 312 of FIG. 3, 418 of FIG. 4, and 612 of FIG. 6) may land and engage a container (e.g. 316 of FIG. 3, 416 of FIG. 4, and 616 of FIG. 6) to lift up the container and the one or more markers (e.g. 410 and 420 of FIG. 4, and 812 of FIG. 8) are marked on or about a location of one or more corner castings (e.g. 318 and 320 of FIG. 3, and 412 and 422 of FIG. 4) of the container present in the one or more images.

The crane spreader (e.g. 1112 of FIG. 11) can carry a container (e.g. 1116 of FIG. 11) and may land the carried container on a second container (e.g. 1122 of FIG. 11) and the one or more markers (e.g. 1210 and 1212 of FIG. 12) are marked on or about a location of one or more corner castings (e.g. 1214 and 1224 of FIG. 12) of the second container present in the one or more images (e.g. 1102 to 1108 of FIG. 11, and 1202 to 1208 of FIG. 12).

The crane spreader (e.g. 912 of FIG. 9) can carry a container (e.g. 916 of FIG. 9) and may land the carried container on a ground (e.g. 914 of FIG. 9) at the location, the ground comprises ground marking (e.g. 922 or 924 of FIG. 9) and the one or more markers (e.g. 1010 and 1012 of FIG. 10) are marked on or about the ground marking present in the one or more images (e.g. 902 to 908 of FIG. 9, and 1002 to 1008 of FIG. 10).

The crane spreader (e.g. 1312 of FIG. 13) can carry a container (e.g. 1316 of FIG. 13) and may land the carried container on a trailer (e.g. 1326 of FIG. 13) and the one or more markers (e.g. 1410 and 1412 of FIG. 14) are marked on or about a location of a landing guide (e.g. 1322 or 1324 of FIG. 13) of the trailer present in the one or more images (e.g. 1302 to 1308 of FIG. 13, and 1402 to 1408 of FIG. 14).

Two markers (e.g. 410 and 420 of FIG. 4, 1010 and 1012 of FIG. 10, and 1410 and 1412 of FIG. 14) may be marked and the two markers correspond with opposite ends of a longer side of a container or a container placement lot on which the crane spreader is to land.

Two markers (e.g. 1210 and 1212 of FIG. 12) may be marked and the two markers correspond with opposite ends located diagonally of a container or on which the crane spreader is to land.

Determining the values defining positioning of the crane spreader relative to the position data of two of the one or more markers to offset may include controlling the apparatus to: plot a first line (e.g. T1-T2 of FIG. 5) intersecting the position data of a first marker in a first image and the position data of a second marker in a second image, determine a center (e.g. 504 of FIG. 5) of the first line, plot a second line (e.g. A1-A2 of FIG. 5) based on the predetermined data of orientation of the crane spreader when the first image and the second image are captured respectively, determine a center (e.g. 502 of FIG. 5) of the second line, determine, along a first axis (e.g. Axis Y denoted in FIG. 5) parallel to the second line, a first offset distance (e.g. y of FIG. 5) of the center of the second line from the center of the first line, determine, along a second axis (e.g. Axis X denoted in FIG. 5) perpendicular to the first axis, a second offset distance (e.g. x of FIG. 5) of the center of the second line from the center of the first line, and determine an angle (e.g. S of FIG. 5) between the first line and the second line, wherein values of the first offset distance, the second offset distance and the angle are determined as the values defining the positioning of the crane spreader relative to the position data of two of the one or more markers to offset.

The apparatus may be further controlled to: receive user input of a request to re-capture another image and transmitting the request for re-capture; receive and display the re-captured image; and receive user input to mark the one or more markers on the re-captured image.

A method for remote crane control, the method comprising: receiving one or more images (e.g. 302 to 308 of FIG. 3, 402 to 408 of FIG. 4, 602 to 608 of FIG. 6, 702 to 708 of FIG. 7, 802 to 808 of FIG. 8, 902 to 908 of FIG. 9, 1002 to 1008 of FIG. 10, 1102 to 1108 of FIG. 11, 1202 to 1208 of FIG. 12, 1302 to 1308 of FIG. 13 and 1402 to 1408 of FIG. 14) comprising a view of a location on which a crane spreader (e.g. 312 of FIG. 3, 418 of FIG. 4, 612 of FIG. 6, 912 of FIG. 9, 1112 of FIG. 11, and 1312 of FIG. 13) is to land; displaying the one or more images on a display; receiving user input to mark one or more markers (e.g. 410 and 420 of FIG. 4, 812 of FIG. 8, 1010 and 1012 of FIG. 10, 1210 and 1212 of FIG. 12, and 1410 and 1412 of FIG. 14) on the one or more received images to facilitate landing of the crane spreader; and transmitting position data of the one or more markers in the one or more received images to a processor (e.g. a processor or processing unit of the remote personal computer 104, the remote mobile device 106, the image processing personal computer 112 and/or the crane controller 122) for determining values defining positioning of the crane spreader relative to the position data of the one or more markers to offset so that the crane spreader proceeds to land based on the determined values.

Figure 16:
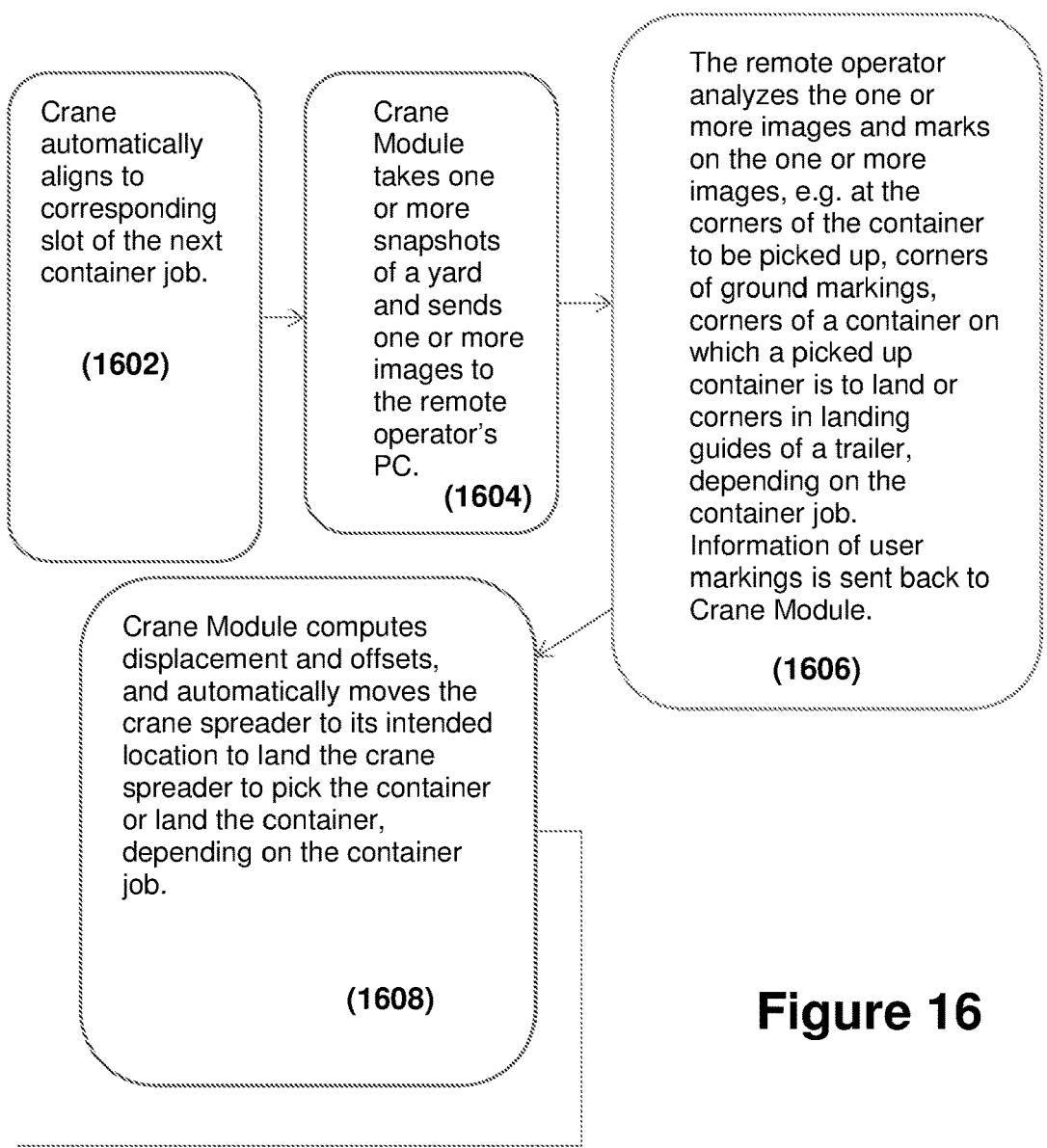
FIG. 16 illustrates a method of an example of the present invention.
Figure 16:
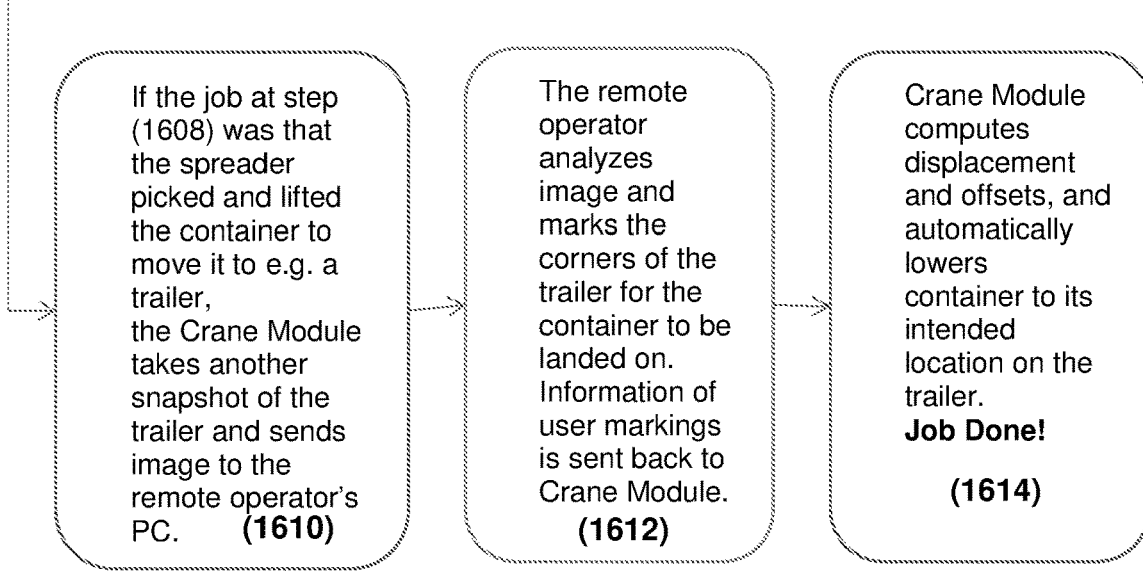

With reference to FIG. 16, the method of the present disclosure is further elaborated by the method steps as follows.

At a step 1602, a crane automatically aligns to a corresponding slot of a container job (crane operation) to be carried out.

At a step 1604, a crane module (e.g. a module controlled by the image processing personal computer 112 of FIG. 1 and working in conjunction with the crane controller 122 of FIG. 1) takes one or more snapshots of a yard, which is a location of the job and sends images of the one or more snapshots to a remote crane operator's personal computer.

At a step 1606, the remote operator analyzes the one or more images and marks on the one or more images, for example, at the corners of the container to be picked up, corners of ground markings, or corners in landing guides of a trailer, corners of a container on which a picked up container is to land, depending on the container job. Information of the user markings is sent back to the crane module.

At a step 1608, the crane module computes displacement and offsets (i.e. offset values), and automatically instructs to move the crane spreader of the crane to its intended location/position to land the crane spreader to pick the container or land the crane spreader carrying the container, depending on the container job.

If the job at step 1608 was that the crane spreader picked and lifted the container to move it to, for instance, a trailer, the crane module takes another snapshot or snapshots of the trailer and sends the corresponding image or images to the remote operator's personal computer at a step 1610.

At step 1612, the remote operator analyzes the one or more images and marks at corners of the trailer for the container to be landed on. Information of the user markings is sent back to the crane module.

At step 1614, the crane module computes displacement and offsets (i.e. offset values), and automatically instructs the crane spreader to lower the container to its intended location on the trailer. Thereafter, the container job is considered done.

It should be appreciated that although it is desirable to fully automate crane control and depend entirely on computers/machines, there are several setbacks as explained in the background section of the present disclosure. The apparatus and its examples described in the present disclosure takes a step back to allow a human operator to have some control and have greatly simplified the crane control job of the operator. Furthermore, the current inability of machines to consider or fully consider safety of crew working in the vicinity of the site of the crane is addressed by allowing a human operator to take some control. However, areas in which human errors may be prone are assisted by computers/machines, such as the computer/machine generated boundaries surrounding a suggested region/area a crane operator should mark. In addition, the high setup and equipment cost, and high maintenance cost of a fully automated crane control system can be avoided.

Many modifications and other examples can be made to the apparatus and method for remote crane control by those skilled in the art having the understanding of the above described disclosure together with the drawings. Therefore, it is to be understood that the apparatus and method for remote crane control is not to be limited to the above description contained herein only, and that possible modifications are to be included in the claims of the disclosure. Any features found in any one of the examples in the Figures can also be applied to the example in another Figure if deemed suitable and appropriate to a skilled person.

The invention claimed is:

1. An apparatus for remote container crane control, the apparatus comprising:
a memory for storing instructions; and
a processing unit configured to execute the instructions stored in the memory to control the apparatus to:
receive one or more images comprising a view of a location on which a container crane spreader is to land;
display the one or more images on a display;
receive user input to mark one or more markers on the one or more received images to facilitate landing of the container crane spreader;
transmit position data of the one or more markers in the one or more received images to a processor for determining values defining positioning of the container crane spreader relative to the position data of the one or more markers to offset, wherein the processor is configured to execute instructions stored in a memory to determine the values; and
control the container crane spreader to land based on the determined values,
wherein the apparatus is controllable to:
in the case that the container crane spreader is not carrying a container, control the container crane spreader to land and engage a container to lift up the container when two markers marked on the one or more received images are received, wherein a first marker is marked at a corner of a first corner casting of the container and a second marker is marked at a corner of a second corner casting of the container, or
in the case that the container crane spreader is carrying a container, control the container crane spreader to land the container on a second container when two markers marked on the one or more received images are received, wherein a first marker is marked at a corner of a first corner casting of the second container and a second marker is marked at a corner of a second corner casting of the second container.

2. The apparatus as claimed in claim 1, wherein the one or more images is captured by at least one camera mounted on the container crane spreader and the at least one camera is configured to capture the one or more images at a predetermined distance from a surface beneath the container crane spreader that is closest to the at least one camera.

3. The apparatus as claimed in claim 1, the apparatus being further controllable to display at least one boundary in the one or more images to suggest that the user should mark somewhere in the at least one boundary.

4. The apparatus as claimed in claim 3, the apparatus being further controllable to display a boundary within the at least one boundary to suggest that the user should mark somewhere in the boundary within the at least one boundary.

5. The apparatus as claimed in claim 3, wherein if one or more markers is not marked within the boundary, an action to notify the user is performed.

6. The apparatus as claimed in claim 1, wherein each of the one or more images is a static image.

7. The apparatus as claimed in claim 1, wherein the apparatus is controllable to:
in the case that the container crane spreader is carrying a container, control the container crane spreader to land the carried container on a ground at the location when one or more markers marked on the one or more received images showing the ground are received, wherein the one or more markers are marked on or about ground markings present in the one or more received images.

8. The apparatus as claimed in claim 1, wherein the apparatus is controllable to:
in the case that the container crane spreader is carrying a container, control the container crane spreader to land the carried container on a trailer when one or more markers marked on the one or more received images showing the trailer are received, wherein the one or more markers are marked on or about a location of a landing guide of the trailer present in the one or more images.

9. The apparatus as claimed in claim 1, wherein the two markers to be marked are located at opposite ends of a longer side of a container on which the container crane spreader is to land.

10. The apparatus as claimed in claim 1, wherein the two markers to be marked are located at opposite ends located diagonally of a container on which the container crane spreader is to land.

11. The apparatus as claimed in claim 1, wherein the apparatus is controllable to subject the one or more received images to processing to:
determine coordinates of a first line intersecting the position data of a first marker in a first image and the position data of a second marker in a second image,
determine a center of the first line,
determine coordinates of a second line based on predetermined data of orientation of the container crane spreader when the first image and the second image are captured respectively,
determine a center of the second line,
determine coordinates of a first axis parallel to the second line, and determine along the first axis parallel to the second line, a first offset distance of the center of the second line from the center of the first line,
determine coordinates of a second axis perpendicular to the first axis, and determine along a second axis perpendicular to the first axis, a second offset distance of the center of the second line from the center of the first line, and
determine an angle between the first line and the second line,
wherein values of the first offset distance, the second offset distance and the angle are the values defining the positioning of the container crane spreader relative to the position data of two of the one or more markers to offset.

12. The apparatus as claimed in claim 1, wherein the apparatus is further controllable to:
receive user input of a request to re-capture another image and transmit the request to enable one or more cameras to proceed with the re-capture;
receive and display the re-captured image; and
receive user input to mark the one or more markers on the re-captured image.

13. The apparatus as claimed in claim 1, wherein the corner of the first corner casting that is marked or the corner of the second corner casting of the second container that is marked is a sharp pointed edge furthest from a central point of the container or the second container.

14. A method for remote container crane control, the method comprising:
receiving one or more images comprising a view of a location on which a container crane spreader is to land;
displaying the one or more images on a display;
receiving user input to mark one or more markers on the one or more received images to facilitate landing of the container crane spreader;
transmitting position data of the one or more markers in the one or more received images to a processor for determining values defining positioning of the container crane spreader relative to the position data of the one or more markers to offset, wherein the processor is configured to execute instructions stored in a memory to determine the values; and
controlling the container crane spreader to land based on the determined values, wherein
in the case that the container crane spreader is not carrying a container, activating the container crane spreader to land and engage a container to lift up the container when two markers marked on the one or more received images are received, wherein a first marker is marked at a corner of a first corner casting of the container and a second marker is marked at a corner of a second corner casting of the container, or
in the case that the container crane spreader is carrying a container, activating the container crane spreader to land the container on a second container when two markers marked on the one or more received images are received, wherein a first marker is marked at a corner of a first corner casting of the second container and a second marker is marked at a corner of a second corner casting of the second container.

15. One or more non-transitory computer-readable media comprising computer-executable instructions that, when executed by a computing system, cause the computing system to perform a method for remote container crane control, the method comprising:
receiving one or more images comprising a view of a location on which a container crane spreader is to land;
displaying the one or more images on a display;
receiving user input to mark one or more markers on the one or more received images to facilitate landing of the container crane spreader;
transmitting position data of the one or more markers in the one or more received images;
determining values defining positioning of the container crane spreader relative to the position data of the one or more markers to offset; and
controlling the container crane spreader to land based on the determined values, wherein:
in a first case that the container crane spreader is not carrying a container, activating the container crane spreader to land and engage a container to lift up the container when two markers marked on the one or more received images are received, wherein a first marker is marked at a corner of a first corner casting of the container and a second marker is marked at a corner of a second corner casting of the container, or in a second case that the container crane spreader is carrying a container, activating the container crane spreader to land the container on a second container when two markers marked on the one or more received images are received, wherein a first marker is marked at a corner of a first corner casting of the second container and a second marker is marked at a corner of a second corner casting of the second container.

* * * * *